United States Patent
Zhang et al.

(10) Patent No.: US 11,290,223 B1
(45) Date of Patent: Mar. 29, 2022

(54) PHYSICAL LAYER (PHY) DATA UNIT ENCODING FOR HYBRID AUTOMATIC REPEAT REQUEST (HARQ) TRANSMISSION

(71) Applicant: Marvell Asia Pte, Ltd., Singapore (SG)

(72) Inventors: Yan Zhang, Palo Alto, CA (US); Hongyuan Zhang, Fremont, CA (US); Liwen Chu, San Ramon, CA (US); Rui Cao, Sunnyvale, CA (US)

(73) Assignee: Marvell Asia Pte Ltd, Singapore (SG)

( * ) Notice: Subject to any disclaimer, the term of this patent is extended or adjusted under 35 U.S.C. 154(b) by 83 days.

(21) Appl. No.: 16/912,643

(22) Filed: Jun. 25, 2020

Related U.S. Application Data

(60) Provisional application No. 62/866,475, filed on Jun. 25, 2019.

(51) Int. Cl.
  *H04L 1/18* (2006.01)
  *H04L 5/00* (2006.01)
  (Continued)

(52) U.S. Cl.
  CPC .......... *H04L 1/1893* (2013.01); *H04L 1/0008* (2013.01); *H04L 1/1812* (2013.01);
  (Continued)

(58) Field of Classification Search
  CPC . H04W 72/042; H04W 52/04; H04W 52/383; H04W 52/386; H04W 72/0406;
  (Continued)

(56) References Cited

U.S. PATENT DOCUMENTS 6,718,497 B1  4/2004  Whitby-Strevens
7,054,296 B1  5/2006  Sorrells et al.
(Continued)

FOREIGN PATENT DOCUMENTS

WO  WO-2009/120460 A2  10/2009

OTHER PUBLICATIONS

IEEE Draft 802.11ax D3.2, "Draft Standard for Information Technology—Telecommunications and information exchange between systems Local and metropolitan area networks—Specific rqeuirements Part 11: Wireless LAN Medium Access Control (MAC) and Physical Layer (PHY) Specifications—Amendment 1: Enhancements for High . . . " vol. 802.11ax drafts, No. D3.2, pp. 1-698 (Oct. 16, 2018).

(Continued)

*Primary Examiner* — Jung Liu

(57) ABSTRACT

Hybrid automatic repeat request (HARQ) parameters for transmission of respective HARQ data units are determined. Determining HARQ parameters includes determining initial HARQ parameters, including an initial number of orthogonal frequency division multiplexing (OFDM) symbols that will be occupied by the HARQ data unit and an initial pre-coding padding factor corresponding to a boundary within a last OFDM symbol. Based at least in part on the initial pre-coding padding factor, it is determined whether the HARQ data unit will be misaligned with both a beginning of a first OFDM symbol occupied by the HARQ data unit and an end of a last OFDM symbol occupied by the HARQ data unit. When it is determined that the HARQ data unit will be misaligned, the initial pre-coding padding factor is adjusted to account for a reduced data tone OFDM symbol segment to be occupied by the HARQ data unit.

20 Claims, 7 Drawing Sheets

(51) Int. Cl.
*H04L 1/00* (2006.01)
*H04W 84/12* (2009.01)

(52) U.S. Cl.
CPC .......... *H04L 5/0007* (2013.01); *H04L 5/0055* (2013.01); *H04W 84/12* (2013.01)

(58) Field of Classification Search
CPC ... H04W 8/22; H04W 74/0833; H04W 52/18; H04W 52/58; H04W 28/16; H04W 52/54; H04W 72/048; H04W 72/044; H04W 52/146; H04W 52/367; H04W 72/0473; H04W 52/365; H04W 52/343; H04L 1/1896; H04L 1/0013; H04L 1/1835; H04L 1/1887; H04L 1/1854; H04L 29/08567; H04L 1/08; H04L 1/1671; H04L 5/0058
See application file for complete search history.

(56) References Cited

U.S. PATENT DOCUMENTS

| | | | |
|---|---|---|---|
| 8,175,015 | B1 | 5/2012 | Chowdhuri et al. |
| 8,599,803 | B1 | 12/2013 | Zhang et al. |
| 9,319,174 | B2 | 4/2016 | Merlin et al. |
| 9,351,333 | B1 | 5/2016 | Zhang et al. |
| 9,369,240 | B2 | 6/2016 | Pirskanen et al. |
| 9,876,614 | B1 | 1/2018 | Sun et al. |
| 10,135,582 | B1 | 11/2018 | Sun et al. |
| 2005/0180315 | A1 | 8/2005 | Chitrapu et al. |
| 2006/0050742 | A1 | 3/2006 | Grandhi et al. |
| 2007/0186134 | A1 | 8/2007 | Singh et al. |
| 2007/0245205 | A1 | 10/2007 | Popovski et al. |
| 2008/0165670 | A1 | 7/2008 | Tao et al. |
| 2009/0031185 | A1 | 1/2009 | Xhafa et al. |
| 2009/0074088 | A1 | 3/2009 | Tao et al. |
| 2009/0219851 | A1 | 9/2009 | Abraham et al. |
| 2009/0219870 | A1 | 9/2009 | Wengerter et al. |
| 2009/0259915 | A1 | 10/2009 | Livshitz et al. |
| 2010/0054189 | A1 | 3/2010 | Chang et al. |
| 2011/0038332 | A1 | 2/2011 | Liu et al. |
| 2011/0134816 | A1 | 6/2011 | Liu et al. |
| 2011/0199971 | A1 | 8/2011 | Kim et al. |
| 2011/0305176 | A1 | 12/2011 | Wentink |
| 2012/0140753 | A1 | 6/2012 | Lee et al. |
| 2013/0229996 | A1 | 9/2013 | Wang et al. |
| 2013/0315139 | A1 | 11/2013 | Abraham et al. |
| 2014/0079016 | A1 | 3/2014 | Dai et al. |
| 2014/0126580 | A1 | 5/2014 | Sampath et al. |
| 2014/0185695 | A1 | 7/2014 | Kenney et al. |
| 2014/0293868 | A1 | 10/2014 | Levanen et al. |
| 2015/0049677 | A1 | 2/2015 | Lin et al. |
| 2015/0063233 | A1 | 3/2015 | Choi et al. |
| 2016/0380727 | A1 | 12/2016 | Ryu et al. |
| 2017/0013565 | A1* | 1/2017 | Pelletier ............... H04W 52/365 |
| 2017/0230149 | A1 | 8/2017 | Wang et al. |
| 2018/0102929 | A1 | 4/2018 | Lin et al. |
| 2018/0176892 | A1* | 6/2018 | Kim ...................... H04W 52/04 |
| 2018/0302256 | A1 | 10/2018 | Huang et al. |
| 2019/0363843 | A1* | 11/2019 | Gordaychik .......... H04L 1/1854 |
| 2020/0136753 | A1 | 4/2020 | Zhang et al. |
| 2020/0136764 | A1 | 4/2020 | Zhang et al. |
| 2020/0195376 | A1 | 6/2020 | Zhang et al. |

OTHER PUBLICATIONS

IEEE P802.11ax™/D4.0, "Draft Standard for Information technology—Telecommunications and information exchange between systems Local and metropolitan area networks—Specific Requirements, Part 11: Wireless LAN Medium Access Control (MAC) and Physical Layer (PHY) Specifications, Amendment 1: Enhancements for High Efficiency WLAN," IEEE Computer Society, 746 pages (Feb. 2019).

IEEE P802.11ax™/D5.0, "Draft Standard for Information technology—Telecommunications and information exchange between systems Local and metropolitan area networks—Specific Requirements, Part 11: Wireless LAN Medium Access Control (MAC) and Physical Layer (PHY) Specifications, Amendment 1: Enhancements for High Efficiency WLAN," IEEE Computer Society, 772 pages (Oct. 2019).

IEEE P802.15.4m/D3, May 2013 IEEE Standard for Local metropolitan area networks—"Part 15.4: Low Rate Wireless Personal Area Networks (LR-WPANs)", Amendment 6: TV White Space Between 54 MHz and 862 MHz Physical Layer, Excerpt, 2 pages (May 2013).

IEEE Std 802.11-REVmc™/D8.0 (revision of IEEE Std. 802.11™-2012) "Draft Standard for Information technology—Telecommunications and information exchange between systems—Local and metropolitan area networks—Specific requirements" Part 11: Wireless LAN Medium Access Control (MAC) and Physical Layer (PHY) Specifications, *The Institute of Electrical and Electronics Engineers, Inc.*, 3774 pages (Aug. 2016).

Kwon et al., "SIG Structure for UL PPDU," IEEE Draft, doc. IEEE 802.11-15/0574ro, vol. 802.11ax, 18 pages (May 11, 2015).

Merlin et al., "Trigger Frame Format," IEEE Draft, doc. IEEE 802.11-15/0877r1, vol. 802.11ax, No. 1, 16 pages (Jul. 13, 2015).

U.S. Appl. No. 16/894,720, Zhang et al., "Physical Layer (PHY) Data Unit Format for Hybrid Automatic Repeat Request (HARQ)," filed Jun. 5, 2020.

Zhang et al., "EHT Technology Candidate Discussions," doc: IEEE 802.11-18/1161r0, *The Institute of Electrical and Electronics Engineers*, Inc., pp. 1-10 Jul. 8, 2018.

* cited by examiner

PHYSICAL LAYER (PHY) DATA UNIT ENCODING FOR HYBRID AUTOMATIC REPEAT REQUEST (HARQ) TRANSMISSION

CROSS REFERENCES TO RELATED APPLICATIONS

This application claims the benefit of U.S. Provisional Patent Application No. 62/866,475, entitled "Encoding Process and Pre-Forward Error Correction (FEC) Padding for Hybrid ARQ (HARQ) Transmission," filed on Jun. 25, 2019, which is incorporated herein by reference in its entirety.

FIELD OF TECHNOLOGY

The present disclosure relates generally to wireless communication systems, and more particularly to encoding physical layer (PHY) data unit for hybrid automatic repeat request (HARQ) transmissions.

BACKGROUND

In a wireless local area network (WLAN), communication devices exchange control information in media access control (MAC) protocol data units (MPDUs), sometimes referred to as "frames". Typically, multiple MPDUs are aggregated together and transmitted within one physical layer (PHY) protocol data unit (PPDU). If a receiver is unable to decode an MPDU within the PPDU, a transmitter of the MPDU will retransmit the MPDU within another PPDU.

Hybrid automatic repeat request (HARQ) is a technique for improving throughput in communication systems. With HARQ, when a receiver is not able to decode a received communication frame, the receiver stores the transmission in a buffer. Then, a transmitter retransmits the communication frame and the receiver decodes the communication frame using both the original transmission stored in the buffer and the retransmission, e.g., using "soft combining."

One example of a HARQ technique is referred to as "chase combining." In chase combining, the transmitter retransmits the same identical communication frame one or more times, and the receiver "soft combines" the original transmission and the one or more retransmissions to decode the communication frame.

Another example of a HARQ technique is referred to as "incremental redundancy." In incremental redundancy, the original transmission omits some bits (e.g., "puncturing" is used) from an encoded frame, and each retransmission omits different bits and includes some bits that were not included in the previous transmissions. Thus, with each retransmission, the receiver incrementally receives additional information that was not previously transmitted. The receiver then "soft combines" the original transmission and the one or more retransmissions to decode the communication frame.

PPDU formats defined by current WLAN protocols make the use of HARQ impractical. For example, current WLAN protocols specify that when multiple MPDUs are aggregated together and transmitted within one PPDU, the multiple MPDUs are jointly encoded. Thus, even if only one MPDU in the PPDU was not correctly received, all of the MPDUs in the PPDU would need to be retransmitted to implement HARQ in this context. In contrast, not performing HARQ and simply re-encoding the one MPDU and retransmitting the one MPDU is significantly more efficient.

SUMMARY

In an embodiment, a method for hybrid automatic repeat request (HARQ) transmission in a wireless local area network (WLAN) comprises: generating, at a communication device, one or more HARQ data units to be transmitted according to an HARQ process; for respective HARQ data units among the one or more HARQ data units, determining, by the communication device, HARQ parameters to be used for transmission of the HARQ data unit, including: determining initial HARQ parameters to be used for transmission of the HARQ data unit, including i) determining an initial number of orthogonal frequency division multiplexing (OFDM) symbols that will be occupied by the HARQ data unit and ii) determining, based on the initial number of OFDM symbols, an initial pre-FEC coding padding factor corresponding to a boundary within a last OFDM symbol, determining, based at least in part on the initial pre-coding padding factor, whether the HARQ data unit will be misaligned with both i) a beginning of a first OFDM symbol occupied by the HARQ data unit and ii) an end of a last OFDM symbol occupied by the HARQ data unit, and in response to determining that the HARQ data unit will be misaligned with both i) the beginning of a first OFDM symbol occupied by the HARQ data unit and ii) the end of a last OFDM symbol occupied by the HARQ data unit, adjusting the initial pre-coding padding factor to account for a reduced data tone OFDM symbol segment to be occupied by the HARQ data unit; generating, at the communication device using the HARQ parameters, one or more HARQ aggregate data units to include the one or more HARQ data units; and transmitting, with the communication device, the one or more HARQ aggregate data units to one or more other communication devices.

In another embodiment, a communication device comprises a network interface device implemented on one or more integrated circuit (IC) devices. The one or more IC devices are configured to: generate one or more hybrid automatic repeat request (HARQ) data units to be transmitted according to an HARQ process, for respective HARQ data units among the one or more HARQ data units, determine HARQ parameters to be used for transmission of the HARQ data unit, the one or more IC devices being configured to: determine initial HARQ parameters to be used for transmission of the HARQ data unit, including i) determining an initial number of orthogonal frequency division multiplexing (OFDM) symbols that will be occupied by the HARQ data unit and ii) determining, based on the initial number of OFDM symbols, an initial pre-coding padding factor corresponding to a boundary within a last OFDM symbol, determine, based at least in part on the initial pre-coding padding factor, whether the HARQ data unit will be misaligned with both i) a beginning of a first OFDM symbol occupied by the HARQ data unit and ii) an end of a last OFDM symbol occupied by the HARQ data unit, and in response to determining that the HARQ data unit will be misaligned with both i) the beginning of a first OFDM symbol occupied by the HARQ data unit and ii) the end of a last OFDM symbol occupied by the HARQ data unit, adjust the initial pre-coding padding factor to account for a reduced data tone OFDM symbol segment to be occupied by the HARQ data unit; generate, using the HARQ parameters, one or more HARQ aggregate data units to include the one or more HARQ data units; and transmit the one or more HARQ aggregate data units to one or more other communication devices.

DETAILED DESCRIPTION

Figure 1:
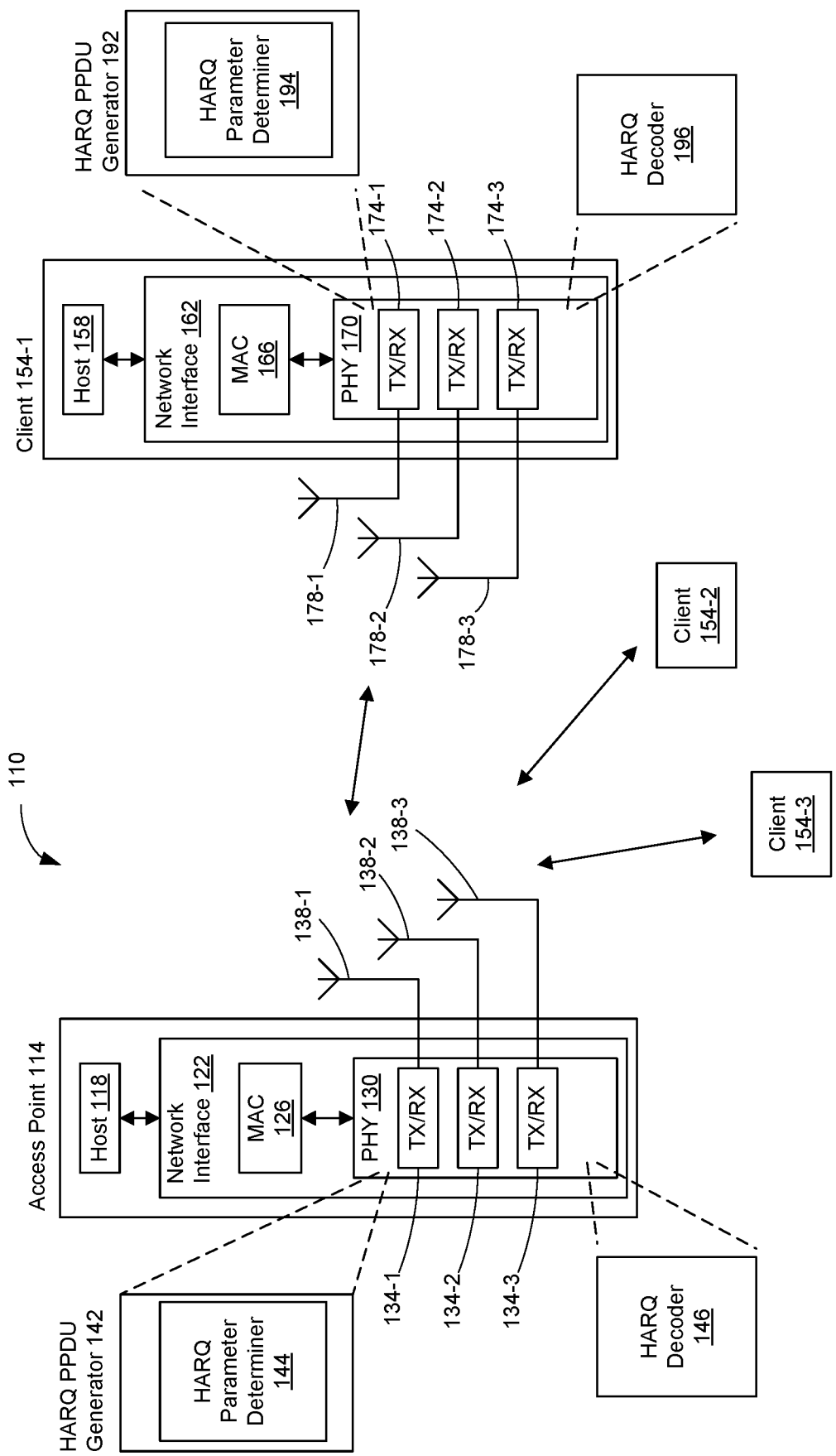
FIG. 1 is a block diagram of an example wireless local area network (WLAN) in which communication devices exchange physical layer (PHY) data units according to a hybrid automatic repeat request (HARQ) process, according to an embodiment.

As discussed above, physical layer (PHY) protocol data unit (PPDU) formats defined by current wireless local area network (WLAN) protocols make the use of Hybrid automatic repeat request (HARQ) prohibitive. For instance, the current WLAN protocols mandate that multiple media access control (MAC) protocol data units (MPDUs) aggregated together (referred to as an aggregate MPDU (A-MPDU)) within one PPDU are all encoded as one entity. As a result, there is no mechanism to ensure that the coded bits corresponding to each MPDU in a first transmission and in subsequent retransmissions are identical unless the entire A-MPDU is retransmitted. But retransmitting the entire A-MPDU if only a small fraction of MPDUs are not correctly received wastes radio resource, which will offset the benefits of using HARQ in many cases.

In embodiments disclosed herein, PPDU format changes facilitate using HARQ with WLAN communications. For instance, in some embodiments described below, when multiple MPDUs are to be aggregated as an A-MPDU within one PPDU and when HARQ is to be used, each MPDU is individually encoded as an HARQ data unit. In another embodiment, a plurality of HARQ coding units is generated, each HARQ coding unit including a respective set of one or more MPDUs, and each of the plurality of HARQ coding units is individually encoded as an HARQ data unit.

In an embodiment, individually encoding each MPDU or coding unit includes determining HARQ parameters to be used for encoding and transmission of each MPDU or coding unit. In some embodiments, for respective HARQ data units to be included in an HARQ PHY data units, determining HARQ parameters includes i) determining an initial number of orthogonal frequency division multiplexing (OFDM) symbols that will be occupied by the HARQ data unit and ii) determining, based on the initial number of OFDM symbols, an initial pre-coding padding factor corresponding to a boundary within a last OFDM symbol. As will be discussed in more detail below, in some embodiments, determining the HARQ parameters also includes determining, based at least in part on the initial pre-coding padding factor, whether the HARQ data unit will be misaligned with both i) a beginning of a first OFDM symbol occupied by the HARQ data unit and ii) an end of a last OFDM symbol occupied by the HARQ data unit. In response to determining that the HARQ data unit will be misaligned with both i) the beginning of a first OFDM symbol occupied by the HARQ data unit and ii) the end of a last OFDM symbol occupied by the HARQ data unit, the initial pre-coding padding factor is adjusted to account for a reduced data tone OFDM symbol segment to be occupied by the HARQ data unit, in an embodiment. Adjusting the initial number of OFDM symbols for the HARQ data units that are misaligned with both i) a beginning of a first OFDM symbol occupied by the HARQ data unit and ii) an end of a last OFDM symbol occupied by the HARQ data unit ensures that a proper number of coded bits in the last-occurring OFDM symbol of the HARQ data unit is determined, in an embodiment.

FIG. 1 is a block diagram of an example WLAN 110, according to an embodiment. The WLAN 110 includes an access point (AP) 114 that is configured to transmit and receive PPDUs that are formatted for HARQ. The AP 114 comprises a host processor 118 coupled to a network interface device 122. The network interface 122 includes a media access control (MAC) layer processor 126 (referred to as a "MAC processor") and a PHY processor 130. The PHY processor 130 includes a plurality of transceivers 134, and the transceivers 134 are coupled to a plurality of antennas 138. Although three transceivers 134 and three antennas 138 are illustrated in FIG. 1, the AP 114 includes other suitable numbers (e.g., 1, 2, 4, 5, etc.) of transceivers 134 and antennas 138 in other embodiments. In some embodiments, the AP 114 includes a higher number of antennas 138 than transceivers 134, and antenna switching techniques are utilized.

The network interface 122 is implemented using one or more integrated circuits (ICs) configured to operate as discussed below. For example, the MAC processor 126 may be implemented, at least partially, on a first IC, and the PHY processor 130 may be implemented, at least partially, on a second IC. As another example, at least a portion of the MAC processor 126 and at least a portion of the PHY processor 130 may be implemented on a single IC. For instance, the network interface 122 may be implemented using a system on a chip (SoC), where the SoC includes at least a portion of the MAC processor 126 and at least a portion of the PHY processor 130.

In an embodiment, the host processor 118 includes a processor configured to execute machine readable instructions stored in a memory device (not shown) such as a random access memory (RAM), a read-only memory (ROM), a flash memory, etc. In an embodiment, the host processor 118 may be implemented, at least partially, on a first IC, and the network device 122 may be implemented, at least partially, on a second IC. As another example, the host processor 118 and at least a portion of the network interface 122 may be implemented on a single IC.

In various embodiments, the MAC processor 126 and/or the PHY processor 130 of the AP 114 are configured to generate data units, and process received data units, that conform to a WLAN communication protocol such as a communication protocol conforming to the IEEE 802.11 Standard or another suitable wireless communication protocol. For example, the MAC processor 126 is configured to implement MAC layer functions, including MAC layer functions of the WLAN communication protocol, and the PHY processor 130 is configured to implement PHY functions, including PHY functions of the WLAN communication protocol. For instance, the MAC processor 126 is configured to generate MAC layer data units such as MAC service data units (MSDUs), MPDUs, A-MPDUs, etc., and provide the MAC layer data units to the PHY processor 130.

In an embodiment, the MAC processor 126 includes a padding unit that is configured to determine a number of padding bits to be added to an MPDU, and to add the determined number of padding bits to the MPDU. In an embodiment, the padding unit comprises a logic circuit that is configured to determine the number of padding bits to be added to the MPDU, and/or to add the determined number of padding bits to the MPDU. In an embodiment, the padding unit is implemented at least partially by a processor of the MAC processor 126, wherein the processor executes machine readable instructions that, when executed by the processor, cause the processor to determine the number of padding bits to be added to the MPDU, and/or to add the determined number of padding bits to the MPDU, and/or control a logic circuit of the MAC processor 126 to add the determined number of padding bits to the MPDU.

The PHY processor 130 is configured to receive MAC layer data units from the MAC processor 126 and encapsulate the MAC layer data units to generate PHY data units such as PHY protocol data units (PPDUs), PHY protocol service data units (PSDUs), etc., for transmission via the antennas 138. Similarly, the PHY processor 130 is configured to receive PHY data units that were received via the antennas 138, and extract MAC layer data units encapsulated within the PHY data units. The PHY processor 130 may provide the extracted MAC layer data units to the MAC processor 126, which processes the MAC layer data units.

In an embodiment, the PHY processor 130 includes one or more forward error correction (FEC) encoders that are configured to encode bits in a MAC layer data unit according to one or more FEC coding schemes. For example, the PHY processor 130 includes a binary convolutional code (BCC) encoder, according to an embodiment. As another example, the PHY processor 130 additionally or alternatively includes a low density parity check (LDPC) encoder, according to another embodiment. In an embodiment, the FEC encoder comprises a logic circuit that is configured to encode bits in a MAC layer data unit according to an FEC coding scheme. In an embodiment, the FEC encoder is implemented at least partially by a processor of the PHY processor 130, wherein the processor executes machine readable instructions that, when executed by the processor, cause the processor to encode bits in a MAC layer data unit according to an FEC coding scheme.

Similarly, in an embodiment, the PHY processor 130 includes one or more FEC decoders that are configured to decode bits in a PHY data unit according to one or more FEC coding schemes. For example, the PHY processor 130 includes a BCC decoder, according to an embodiment. As another example, the PHY processor 130 additionally or alternatively includes an LDPC decoder, according to another embodiment. In an embodiment, the FEC decoder comprises a logic circuit that is configured to decode bits in a PHY data unit according to an FEC coding scheme. In an embodiment, the FEC decoder is implemented at least partially by a processor of the PHY processor 130, wherein the processor executes machine readable instructions that, when executed by the processor, cause the processor to decode bits in a PHY data unit according to an FEC coding scheme.

In an embodiment, the PHY processor 130 includes a padding unit that is configured to determine a number of padding bits to be added to a PHY data unit, and to add the determined number of padding bits to the PHY data unit. In an embodiment, some padding bits are added to the PHY data unit prior to the PHY processor 130 performing FEC encoding of the PHY data unit, and some padding bits are added to the PHY data unit after the PHY processor 130 performs FEC encoding of the PHY data unit. Accordingly, the padding unit is configured to determine a first number of padding bits to be added to a PHY data unit prior to performing FEC encoding of the PHY data unit, and to determine a second number of padding bits to be added to the PHY data unit after performing FEC encoding of the PHY data unit, in an embodiment.

In an embodiment, the padding unit comprises a logic circuit that is configured to determine the number of padding bits to be added to the PHY data unit, and/or to add the determined number of padding bits to the PHY data unit. In an embodiment, the padding unit is implemented at least partially by a processor of the PHY processor 130, wherein the processor executes machine readable instructions that, when executed by the processor, cause the processor to determine the number of padding bits to be added to the PHY data unit, and/or to add the determined number of padding bits to the PHY data unit, and/or control a logic circuit of the PHY processor 130 to add the determined number of padding bits to the PHY data unit.

In various embodiments, the MAC processor 126 is configured to generate and process MAC layer data units such as described herein. In various embodiments, the PHY processor 130 is configured to generate and process PHY data units such as described herein.

The PHY processor 130 is configured to downconvert one or more radio frequency (RF) signals received via the one or more antennas 138 to one or more baseband analog signals, and convert the analog baseband signal(s) to one or more digital baseband signals, according to an embodiment. The PHY processor 130 is further configured to process the one or more digital baseband signals to demodulate the one or more digital baseband signals and to generate a PPDU. The PHY processor 130 includes amplifiers (e.g., a low noise amplifier (LNA), a power amplifier, etc.), a radio frequency (RF) downconverter, an RF upconverter, a plurality of filters, one or more analog-to-digital converters (ADCs), one or more digital-to-analog converters (DACs), one or more discrete Fourier transform (DFT) calculators (e.g., a fast Fourier transform (FFT) calculator), one or more inverse discrete Fourier transform (IDFT) calculators (e.g., an inverse fast Fourier transform (IFFT) calculator), one or more modulators, one or more demodulators, etc.

The PHY processor 130 is configured to generate one or more RF signals that are provided to the one or more antennas 138. The PHY processor 130 is also configured to receive one or more RF signals from the one or more antennas 138.

The MAC processor 126 is configured to control the PHY processor 130 to generate one or more RF signals by, for example, providing one or more MAC layer data units (e.g., MPDUs) to the PHY processor 130, and optionally providing one or more control signals to the PHY processor 130, according to some embodiments. In an embodiment, the MAC processor 126 includes a processor configured to execute machine readable instructions stored in a memory device (not shown) such as a RAM, a read ROM, a flash memory, etc. In an embodiment, the MAC processor 126 includes a hardware state machine that is configured to perform MAC layer functions, control the PHY processor 130, etc.

In an embodiment, the PHY processor 130 includes a HARQ PPDU generator 142 that is configured to generate PPDUs that are formatted for HARQ transmissions (sometimes referred to herein as "HARQ PPDUs"), according to an embodiment. For example, the HARQ PPDU generator 142 is configured to generate HARQ PPDUs to include individually encoded MPDUs, or individually encoded common-length HARQ coding units each including one or multiple MPDUs, such as described herein. In an embodiment, the HARQ PPDU generator 142 includes a HARQ parameter determiner 144 that is configured to determine i) parameters to be used with first transmission individual HARQ PSDUs or HARQ coding units and ii) retransmission parameters to be used with retransmission HARQ PSDUs or HARQ coding units. For example, the HARQ parameter determiner 144 is configured to determine HARQ encoding and retransmission parameters as described herein.

In an embodiment, the HARQ PPDU generator 142 is implemented by a processor configured to execute machine readable instructions stored in a memory device (not shown) such as a RAM, a ROM, a flash memory, etc. In an embodiment, the HARQ PPDU generator 142 additionally or alternatively includes a hardware state machine that is configured to generate HARQ PPDUs such as described herein. Similarly, the HARQ parameter determiner 144 is implemented by a processor configured to execute machine readable instructions stored in a memory device (not shown) such as a RAM, a ROM, a flash memory, etc. In an embodiment, the HARQ parameter determiner 144 additionally or alternatively includes a hardware state machine that is configured to generate delimiter fields such as described herein.

In an embodiment, the PHY processor 130 also includes a HARQ decoder 146 that is configured to decode an MPDU by "soft combining" an original transmission of the MPDU and one or more retransmissions of the MPDU. The HARQ decoder 146 is configured to use HARQ-related information in a HARQ SIG field of a HARQ PPDU to identify within the HARQ PPDU a beginning and an end of an individually encoded MPDU or HARQ coding unit, so that the received MPDUs or coding units can be "soft combined" with another transmission of the MPDUs or coding units, according to an embodiment.

In an embodiment, the HARQ decoder 146 is implemented by a processor configured to execute machine readable instructions stored in a memory device (not shown) such as a RAM, a ROM, a flash memory, etc. In an embodiment, the HARQ decoder 146 additionally or alternatively includes a hardware state machine that is configured to process HARQ SIG fields such as described herein and/or identify MPDUs within HARQ PPDUs such as described herein.

The WLAN 110 includes a plurality of client stations 154 that are configured to transmit and receive HARQ PPDUs. Although three client stations 154 are illustrated in FIG. 1, the WLAN 110 includes other suitable numbers (e.g., 1, 2, 4, 5, 6, etc.) of client stations 154 in various embodiments. The client station 154-1 includes a host processor 158 coupled to a network interface device 162. The network interface 162 includes a MAC processor 166 and a PHY processor 170. The PHY processor 170 includes a plurality of transceivers 174, and the transceivers 174 are coupled to a plurality of antennas 178. Although three transceivers 174 and three antennas 178 are illustrated in FIG. 1, the client station 154-1 includes other suitable numbers (e.g., 1, 2, 4, 5, etc.) of transceivers 174 and antennas 178 in other embodiments. In some embodiments, the client station 154-1 includes a higher number of antennas 178 than transceivers 174, and antenna switching techniques are utilized.

The network interface 162 is implemented using one or more ICs configured to operate as discussed below. For example, the MAC processor 166 may be implemented on at least a first IC, and the PHY processor 170 may be implemented on at least a second IC. As another example, at least a portion of the MAC processor 166 and at least a portion of the PHY processor 170 may be implemented on a single IC. For instance, the network interface 162 may be implemented using an SoC, where the SoC includes at least a portion of the MAC processor 166 and at least a portion of the PHY processor 170.

In an embodiment, the host processor 158 includes a processor configured to execute machine readable instructions stored in a memory device (not shown) such as a RAM, a ROM, a flash memory, etc. In an embodiment, the host processor 158 may be implemented, at least partially, on a first IC, and the network device 162 may be implemented, at least partially, on a second IC. As another example, the host processor 158 and at least a portion of the network interface 162 may be implemented on a single IC.

In various embodiments, the MAC processor 166 and the PHY processor 170 of the client device 154-1 are configured to generate data units, and process received data units, that conform to the WLAN communication protocol or another suitable communication protocol. For example, the MAC processor 166 is configured to implement MAC layer functions, including MAC layer functions of the WLAN communication protocol, and the PHY processor 170 is configured to implement PHY functions, including PHY functions of the WLAN communication protocol. The MAC processor 166 is configured to generate MAC layer data units such as MSDUs, MPDUs, A-MPDUs, etc., and provide the MAC layer data units to the PHY processor 170.

In an embodiment, the MAC processor 166 includes a padding unit that is configured to determine a number of padding bits to be added to an MPDU, and to add the determined number of padding bits to the MPDU. In an embodiment, the padding unit comprises a logic circuit that is configured to determine the number of padding bits to be added to the MPDU, and/or to add the determined number of padding bits to the MPDU. In an embodiment, the padding unit is implemented at least partially by a processor of the MAC processor 166, wherein the processor executes machine readable instructions that, when executed by the processor, cause the processor to determine the number of padding bits to be added to the MPDU, and/or to add the determined number of padding bits to the MPDU, and/or control a logic circuit of the MAC processor 166 to add the determined number of padding bits to the MPDU.

The PHY processor 170 is configured to receive MAC layer data units from the MAC processor 166 and encapsulate the MAC layer data units to generate PHY data units such as PPDUs, PSDUs, etc., for transmission via the antennas 178. Similarly, the PHY processor 170 is configured to receive PHY data units that were received via the antennas 178, and extract MAC layer data units encapsulated within the PHY data units. The PHY processor 170 may provide the extracted MAC layer data units to the MAC processor 166, which processes the MAC layer data units.

In an embodiment, the PHY processor 170 includes one or more FEC encoders that are configured to encode bits in a MAC layer data unit according to one or more FEC coding schemes. For example, the PHY processor 170 includes a BCC encoder, according to an embodiment. As another example, the PHY processor 170 additionally or alternatively includes an LDPC encoder, according to another embodiment. In an embodiment, the FEC encoder comprises a logic circuit that is configured to encode bits in a MAC layer data unit according to an FEC coding scheme. In an embodiment, the FEC encoder is implemented at least partially by a processor of the PHY processor 170, wherein the processor executes machine readable instructions that, when executed by the processor, cause the processor to encode bits in a MAC layer data unit according to an FEC coding scheme.

Similarly, in an embodiment, the PHY processor 170 includes one or more FEC decoders that are configured to decode bits in a PHY data unit according to one or more FEC coding schemes. For example, the PHY processor 170 includes a BCC decoder, according to an embodiment. As another example, the PHY processor 130 additionally or alternatively includes an LDPC decoder, according to another embodiment. In an embodiment, the FEC decoder comprises a logic circuit that is configured to decode bits in a PHY data unit according to an FEC coding scheme. In an embodiment, the FEC decoder is implemented at least partially by a processor of the PHY processor 170, wherein the processor executes machine readable instructions that, when executed by the processor, cause the processor to decode bits in a PHY data unit according to an FEC coding scheme.

In an embodiment, the PHY processor 170 includes a padding unit that is configured to determine a number of padding bits to be added to a PHY data unit, and to add the determined number of padding bits to the PHY data unit. In an embodiment, some padding bits are added to the PHY data unit prior to the PHY processor 170 performing FEC encoding of the PHY data unit, and some padding bits are added to the PHY data unit after the PHY processor 170 performs FEC encoding of the PHY data unit. Accordingly, the padding unit is configured to determine a first number of padding bits to be added to a PHY data unit prior to performing FEC encoding of the PHY data unit, and to determine a second number of padding bits to be added to the PHY data unit after performing FEC encoding of the PHY data unit, in an embodiment.

In an embodiment, the padding unit comprises a logic circuit that is configured to determine the number of padding bits to be added to the PHY data unit, and/or to add the determined number of padding bits to the PHY data unit. In an embodiment, the padding unit is implemented at least partially by a processor of the PHY processor 170, wherein the processor executes machine readable instructions that, when executed by the processor, cause the processor to determine the number of padding bits to be added to the PHY data unit, and/or to add the determined number of padding bits to the PHY data unit, and/or control a logic circuit of the PHY processor 170 to add the determined number of padding bits to the PHY data unit.

The PHY processor 170 is configured to downconvert one or more RF signals received via the one or more antennas 178 to one or more baseband analog signals, and convert the analog baseband signal(s) to one or more digital baseband signals, according to an embodiment. The PHY processor 170 is further configured to process the one or more digital baseband signals to demodulate the one or more digital baseband signals and to generate a PPDU. The PHY processor 170 includes amplifiers (e.g., an LNA, a power amplifier, etc.), an RF downconverter, an RF upconverter, a plurality of filters, one or more ADCs, one or more DACs, one or more DFT calculators (e.g., an FFT calculator), one or more IDFT calculators (e.g., an IFFT calculator), one or more modulators, one or more demodulators, etc.

The PHY processor 170 is configured to generate one or more RF signals that are provided to the one or more antennas 178. The PHY processor 170 is also configured to receive one or more RF signals from the one or more antennas 178.

The MAC processor 166 is configured to control the PHY processor 170 to generate one or more RF signals by, for example, providing one or more MAC layer data units (e.g., MPDUs) to the PHY processor 170, and optionally providing one or more control signals to the PHY processor 170, according to some embodiments. In an embodiment, the MAC processor 166 includes a processor configured to execute machine readable instructions stored in a memory device (not shown) such as a RAM, a ROM, a flash memory, etc. In an embodiment, the MAC processor 166 includes a hardware state machine that is configured to perform MAC layer functions, control the PHY processor 170, etc.

In an embodiment, the PHY processor 170 includes a HARQ PPDU generator 192 that is configured to generate PPDUs that are formatted for HARQ transmissions (sometimes referred to herein as "HARQ PPDUs"), according to an embodiment. For example, the HARQ PPDU generator 192 is configured to generate HARQ PPDUs to include individually encoded MPDUs, or individually encoded common-length HARQ coding units each including one or multiple MPDUs, such as described herein. In an embodiment, the HARQ PPDU generator 192 includes a HARQ parameter determiner 194 that is configured to determine i) HARQ parameters to be used with first transmission individual HARQ PSDUs or HARQ coding units and ii) HARQ retransmission parameters to be used with retransmission HARQ PSDUs or HARQ coding units. For example, the HARQ parameter determiner 194 is configured to determine HARQ encoding and retransmission parameters as described herein.

In an embodiment, the HARQ PPDU generator 192 is implemented by a processor configured to execute machine readable instructions stored in a memory device (not shown) such as a RAM, a ROM, a flash memory, etc. In an embodiment, the HARQ PPDU generator 192 additionally or alternatively includes a hardware state machine that is configured to generate HARQ PPDUs such as described herein. Similarly, the HARQ parameter determiner 194 is implemented by a processor configured to execute machine readable instructions stored in a memory device (not shown) such as a RAM, a ROM, a flash memory, etc. In an embodiment, the HARQ parameter determiner 194 additionally or alternatively includes a hardware state machine that is configured to generate delimiter fields such as described herein.

In an embodiment, the PHY processor 170 also includes a HARQ decoder 196 that is configured to decode an MPDU by "soft combining" an original transmission of the MPDU and one or more retransmissions of the MPDU. The HARQ decoder 196 is configured to use HARQ-related information in a HARQ SIG field of a HARQ PPDU to identify within the HARQ PPDU a beginning of an individually encoded MPDU, or a beginning of an individually encoded HARQ coding unit that includes one or multiple MPDUS, and an end of the individually encoded MPDU or the individually encoded HARQ coding unit that includes one or multiple MPDUs, so that the received one or more MPDUs can be "soft combined" with another transmission of the one or more MPDUs, according to an embodiment.

In an embodiment, the HARQ decoder 196 is implemented by a processor configured to execute machine readable instructions stored in a memory device (not shown) such as a RAM, a ROM, a flash memory, etc. In an embodiment, the HARQ decoder 196 additionally or alternatively includes a hardware state machine that is configured to process HARQ SIG fields such as described herein and/or identify MPDUs within HARQ PPDUs such as described herein.

In an embodiment, each of the client stations 154-2 and 154-3 has a structure that is the same as or similar to the client station 154-1. Each of the client stations 154-2 and 154-3 has the same or a different number of transceivers and antennas. For example, the client station 154-2 and/or the client station 154-3 each have only two transceivers and two antennas (not shown), according to an embodiment.

PPDUs are sometimes referred to herein as packets. MPDUs are sometimes referred to herein as frames.

Figure 2:
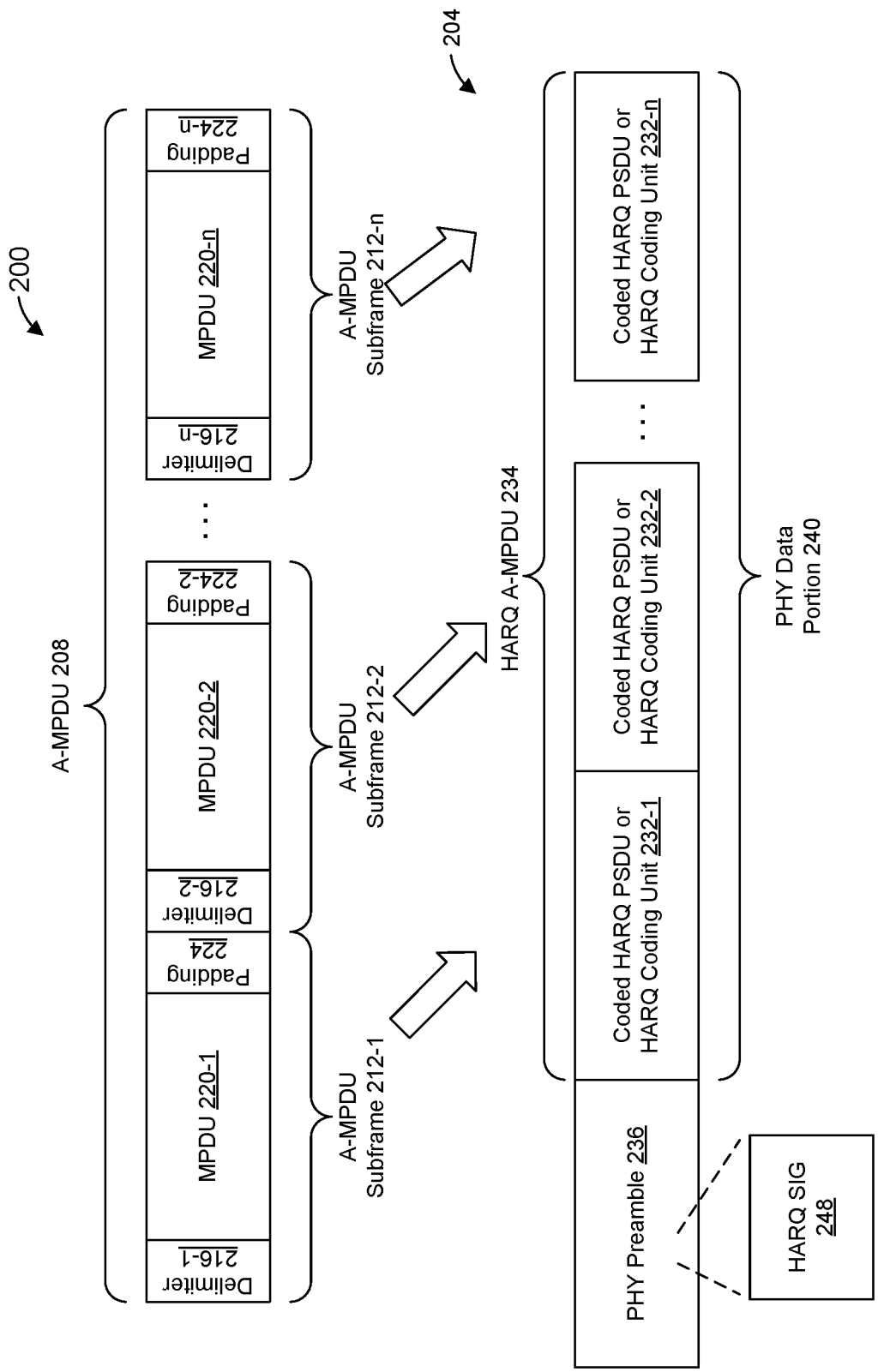
FIG. 2 is a diagram of an example process for generating a PHY data unit that includes a plurality of individually encoded HARQ PHY protocol service data units (PSDUs) in a PHY data portion.

FIG. 2 is a diagram of an example process 200 for generating a PPDU that is formatted for a HARQ transmission (i.e., a "HARQ PPDU"), according to an embodiment. The network interface 122 is configured to perform the process 200, according to an embodiment. Similarly, the network interface 162 is configured to perform the process 200, according to an embodiment. In other embodiments, another suitable WLAN network interface performs the process 200.

The process 200 involves generating a HARQ PPDU 204 using an A-MPDU 208. In an embodiment, the network interface 122/162 is configured to generate the HARQ PPDU 204. In an embodiment, the PHY processor 130/170 is configured to generate the HARQ PPDU 204. In an embodiment, the HARQ PPDU generator 142/192 is configured to generate the HARQ PPDU 204.

In an embodiment, a MAC processor, such as the MAC processor 126 or the MAC processor 166, generates the A-MPDU 208. The A-MPDU 208 includes a plurality of A-MPDU subframes 212, where each A-MPDU subframe 212 corresponds to a PSDU. Each A-MPDU subframe 212 includes an MPDU delimiter 216, an MPDU 220, and optional padding bits 224. In an embodiment, each A-MPDU subframe 212 corresponds to an HARQ data unit to be individually encoded for HARQ transmission. In some embodiments, respective sets of one or more A-MPDU subframes 212 are grouped together to generate respective fixed-length HARQ coding units to be individually encoded for HARQ transmission. Each HARQ data unit, such as each A-MPDU subframe 212 or each HARQ coding unit, is individually encoded by an FEC encoder to generate a coded HARQ PSDU or HARQ coded unit 232 to be included in an HARQ A-MPDU 234, in an embodiment. For example, an FEC encoder of a PHY processor, such as the PHY processor 130 or the PHY processor 170, individually encodes each A-MPDU subframe 212 or each HARQ coding unit to generate a coded HARQ PSDU or HARQ coded unit 232 to be included in the HARQ A-MPDU 234, according to an embodiment. Individually encoding each A-MPDU subframe 212 or each HARQ coding unit facilitates a receiver to perform "soft combining" of an original transmission of the A-MPDU subframe 212 or the HARQ coding unit and one or more retransmissions of the A-MPDU subframe 212 or the HARQ coding unit as part of a HARQ scheme without having to retransmit the entire HARQ A-MPDU 234. In an embodiment, the FEC encoder is a BCC encoder. In another embodiment, the FEC encoder is an LDPC encoder.

The HARQ PPDU 204 is generated to include a PHY preamble 236 and a PHY data portion 240. The PHY data portion 240 includes the HARQ A-MPDU 234. The PHY preamble 236 includes training signals (not shown) for performing one or more of packet detection, synchronization, automatic gain control (AGC) adjustment, channel estimation, etc. Additionally, the PHY preamble 236 includes a plurality of signal (SIG) fields that include indications of PHY parameters corresponding to the HARQ A-MPDU 234 included in the PHY data portion 240 and which a receiver uses to demodulate and decode the HARQ A-MPDU 234. Examples of PHY parameters indicated by the plurality of SIG fields includes one or more of a modulation and coding scheme (MCS) applied to the HARQ A-MPDU 234 by a transmitter, a duration of the HARQ A-MPDU 234, a type of FEC encoding employed, etc.

The plurality of SIG fields includes a SIG field 244 that is included in PPDUs even when HARQ is not being used. Accordingly, the SIG field 244 includes indications of PHY parameters that are not related to HARQ transmission. The plurality of SIG fields also includes a SIG field 248 that includes indications of HARQ parameters (sometimes referred to herein as a "HARQ SIG field") and is only included in PPDUs for which HARQ is being used. Because the HARQ SIG field 248 is only included in PPDUs for which HARQ is being used, the SIG field 244 is configured to indicate whether the PPDU 204 includes the HARQ SIG field 248. For example, the SIG field 244 includes an indicator 252 that indicates whether the PPDU 204 includes the HARQ SIG field 248. The HARQ SIG field 248 includes indications of HARQ parameters used for the PHY data portion 240 of the HARQ PPDU 200, in an embodiment. For example, the HARQ SIG field 248 includes indications of HARQ parameters that apply to respective HARQ PPDUs included in the PHY data portion 240, or a common set of HARQ parameters that applies to each of a plurality of HARQ coding units included in the PHY data portion 240, in various embodiments.

In an embodiment, the HARQ A-MPDU 234 includes one or more first transmission HARQ PPDUs or HARQ coding units and/or one or more retransmission HARQ PPDUs or HARQ coding units. The one or more first transmission HARQ PPDUs or HARQ coding units are individually encoded to generate respective one or more coded HARQ PPDUs or HARQ coding units for transmission in the HARQ A-MPDU 234, in an embodiment. Individually encoding the one or more first transmission HARQ PPDUs or HARQ coding units includes determining respective HARQ parameters for the one or more first transmission HARQ PPDUs to be included in the HARQ A-MPDU 234, or determining a set of HARQ parameters for the first transmission HARQ coding unit to be included in the HARQ A-MPDU 234. For example, a communication device that transmits the HARQ PPDU 200 (or triggers transmission of the HARQ PPDU 200) determines HARQ parameters for each first transmission HARQ PPDU to be included in HARQ A-MPDU 234, or determines a set of HARQ parameters that are to be applied across multiple first transmission HARQ coding units to be included in the HARQ A-MPDU 234, in various embodiments. The HARQ parameters for first transmission HARQ PPDU or HARQ coding unit includes, for example, a number of OFDM symbols occupied by the first transmission HARQ PPDU or HARQ coding unit, a pre-FEC padding factor selected for the first transmission HARQ PPDU or HARQ coding unit, whether an extra LDPC symbol segment is added in the first transmission HARQ PPDU or HARQ coding unit, etc., in an embodiment.

The one or more retransmission HARQ PPDUs or HARQ coding units, on the other hand, are not re-encoded for retransmission in the HARQ A-MPDU 234, in an embodiment. Rather, the corresponding HARQ PPDUs or HARQ coding units that are encoded for a first transmission are buffered in a buffer for potential retransmission, in an embodiment. Then, if a particular HARQ PPDU or HARQ coding unit is to be retransmitted, the corresponding encoded HARQ PPDU or HARQ coding unit is retrieved from the buffer for the retransmission. In various embodiments, a retransmission of a HARQ PPDUs or HARQ coding unit includes all of the coded bits of the corresponding first transmission HARQ PPDUs or HARQ coding unit (e.g., for CC HARQ), or includes a portion of the coded bits of the corresponding first transmission HARQ PPDUs or HARQ coding unit (e.g., for IR HARQ). In an embodiment, a different modulation order as compared to a modulation order that was used in transmission of the corresponding first transmission HARQ PPDU or HARQ coding unit. In general, although the one or more retransmission HARQ PPDUs or HARQ coding units are not re-encoded for retransmission, HARQ parameters of a retransmission HARQ PPDUs or HARQ coding unit are not necessarily the same as HARQ parameters of the corresponding first transmission HARQ PPDUs or HARQ coding unit, in at least some scenarios. For example, a retransmission HARQ PPDU or HARQ coding unit may occupy a different number of OFDM symbols as compared to the number of OFDM symbols occupied by the corresponding first transmission HARQ PPDU or HARQ coding unit and/or a different pre-FEC padding factor may be selected for the retransmission HARQ PPDU or HARQ coding unit as compared to the pre-FEC padding factor that was selected for the corresponding first transmission HARQ PPDU or HARQ coding unit.

In an embodiment in which the HARQ A-MPDU 234 includes both i) one or more first transmission HARQ PPDUs or HARQ coding units and ii) one or more retransmission HARQ PPDUs or HARQ coding units, the one or more retransmission HARQ PPDUs or HARQ coding units are included in a first portion of the HARQ A-MPDU 234 and the one or more retransmission HARQ PPDUs or HARQ coding units are included in a second portion of the HARQ A-MPDU 234, where the first portion precedes the second portion. In other words, the one or more retransmission HARQ PPDUs or HARQ coding units are placed in the HARQ A-MPDU 234 before the one or more first transmission HARQ PPDUs or HARQ coding units, in this embodiment.

The HARQ SIG field 248 of the HARQ PPDU 200 is generated to include parameters used for encoding each first transmission HARQ PPDU or first transmission HARQ coding unit included in the HARQ A-MPDU 234, in an embodiment. For example, the HARQ SIG field 248 is generated to include indications of a number of OFDM symbols occupied by the first transmission HARQ PPDU or HARQ coding unit, a pre-FEC padding factor selected for the first transmission HARQ PPDU or HARQ coding unit, whether an extra LDPC symbol segment is added in the first transmission HARQ PPDU or HARQ coding unit, etc., in an embodiment. The HARQ SIG field 248 of the HARQ PPDU 200 is generated to also include parameters used for transmission of each retransmission HARQ PPDU or HARQ coding unit included in the HARQ A-MPDU 234, in an embodiment. For example, the HARQ SIG field 248 is generated to include indications of a number of OFDM symbols occupied by the retransmission HARQ PPDU or HARQ coding unit and a pre-FEC padding factor selected for the retransmission HARQ PPDU or HARQ coding unit, in an embodiment.

In some embodiments, PPDUs have different formats corresponding to different transmission modes or types. As an illustrative example, two or more PPDU formats correspond to two or more of the following example transmission modes: a single user (SU) mode, a multi-user (MU) mode, a trigger-based transmission mode, an extended range transmission mode, etc. Thus, in some embodiments, the PHY preamble 236 and/or the PHY data portion 240 have different formats depending on a particular transmission mode according to which the HARQ PPDU 204 is to be transmitted.

Figure 3:
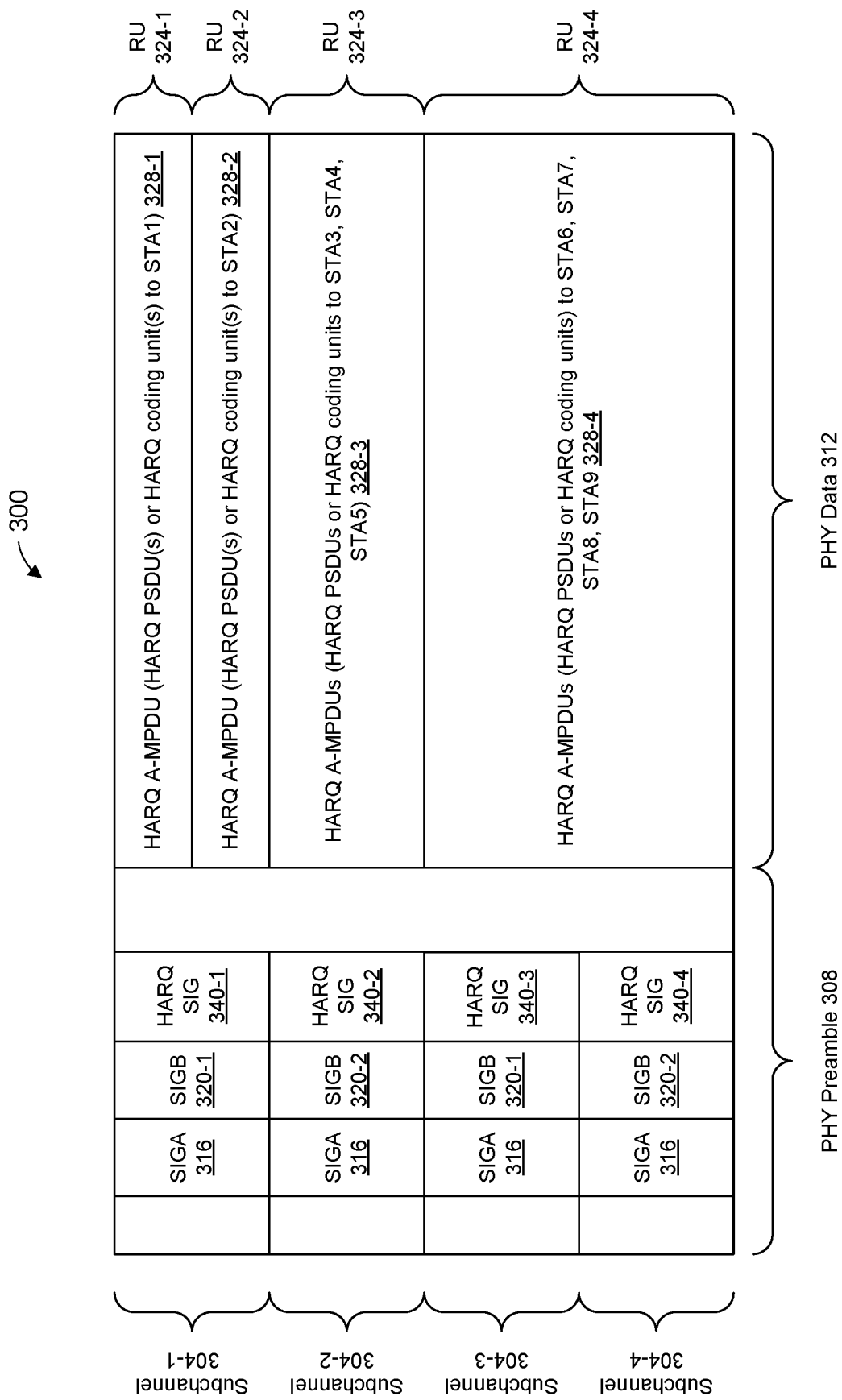
FIG. 3 is a diagram of an example HARQ signal field for a multi-user (MU) PHY data unit, according to an embodiment.

FIG. 3 is a diagram of an example MU HARQ PPDU 300, according to an embodiment. In an embodiment, the network interface 122/162 is configured to generate the MU HARQ PPDU 300. In an embodiment, the PHY processor 130/170 is configured to generate the MU HARQ PPDU 300. In an embodiment, the HARQ PPDU generator 142/192 is configured to generate the MU HARQ PPDU 300.

In the example illustrated in FIG. 3, the MU HARQ PPDU 300 spans four frequency subchannels 304. In other scenarios, the MU HARQ PPDU 300 spans another suitable number of frequency subchannels 304, such as 1, 2, 3, 5, 6, 7, 8, etc.

The MU HARQ PPDU 300 comprises a PHY preamble portion 308 and a PHY data portion 312. The PHY preamble portion 308 comprises a plurality of suitable training signals (not shown). Additionally, the PHY preamble portion 308 comprises a SIG field (SIGA field) 316. An instance of the SIGA field 316 is transmitted in each frequency subchannel 304, according to an embodiment. The SIGA field 316 corresponds to the SIG field 244 discussed above, according to an embodiment.

Additionally, the PHY preamble portion 308 comprises a SIG field (SIGB field) 320. The SIGB field 320 corresponds to the MU SIG field discussed above, according to an embodiment. In the example illustrated in FIG. 3, two versions of the SIGB field 320 are transmitted. In particular, SIGB field version 320-1 is transmitted in frequency subchannels 304-1 and 304-3, and SIGB field version 320-2 is transmitted in frequency subchannels 304-2 and 304-4. In other scenarios (e.g., in which the MU HARQ PPDU 300 spans another suitable number of frequency subchannels), different suitable numbers of versions of the SIGB field 320 are transmitted, such as 1, 4 etc.

The SIGB field 320 includes allocation information that indicates an allocation of frequency RUs 324. In an embodiment, each version of the SIGB field 320 includes allocation information for frequency RUs 324 that overall the frequency subchannels in which the version of the SIGB field 320 is transmitted. For instance, in the illustrative example of FIG. 3, SIGB field 320-1 includes allocation information for RU 324-1, RU 324-2, and RU 324-4, and SIGB field 320-2 includes allocation information for RU 324-3 and RU 324-4.

In the illustrative example of FIG. 3, RU 324-1 is allocated to a first client station (STA1); RU 324-2 is allocated to a second client station (STA2); RU 324-3 is allocated to three client stations (STA3, STA4, STA5) for an MU-MIMO transmission; and RU 324-4 is allocated to four client stations (STA6, STA7, STA8, STA9) for an MU-MIMO transmission. In the illustrative example of FIG. 3, allocation information in SIGB field 320-1 includes an ordering of client stations for RU 324-1, RU 324-2, and RU 324-4, and allocation information in SIGB field 320-2 includes an ordering of client stations for RU 324-3 and RU 324-4.

The PHY data portion 312 includes a plurality of HARQ A-MPDUs 328 for multiple client stations. In the illustrative example of FIG. 3, an HARQ A-MPDU 328-1 that includes one or more first transmission and/or retransmission HARQ PSDUs or HARQ coding units for STA1 is transmitted to STA1 in RU 324-1; an HARQ A-MPDU 328-2 that includes one or more first transmission and/or retransmission HARQ PSDUs or HARQ coding units for STA2 is transmitted to STA2 in RU 324-2; respective HARQ A-MPDU 328-3 that include first transmission and/or retransmission HARQ PSDUs or HARQ coding units for STA3, STA4, and STA5 are transmitted to the STA3, STA4, and STA5 in RU 324-3 using MU-MIMO; respective HARQ A-MPDU 328-4 that include first transmission and/or retransmission HARQ PSDUs or HARQ coding unit for STA6, STA7, STA8, and STA9 are transmitted to STA6, STA7, STA8, and STA9 in RU 324-4 using MU-MIMO.

The PHY preamble portion 308 comprises a plurality of HARQ SIG fields 340. In the example illustrated in FIG. 3, four HARQ SIG fields 340 are transmitted, each corresponding to a frequency subchannel 304. In particular, RU HARQ SIG field 340-1 is transmitted in frequency subchannel 304-1; RU HARQ SIG field 340-2 is transmitted in frequency subchannel 304-2; RU HARQ SIG field 340-3 is transmitted in frequency subchannel 304-3; and RU HARQ SIG field 340-4 is transmitted in frequency subchannel 304-4. In other scenarios (e.g., in which the MU HARQ PPDU 300 spans another suitable number of frequency subchannels 304), different suitable numbers of versions of the HARQ SIG field 340-1 are transmitted, such as 1, 2, 3, 5, 6, 7, 8, etc.

In an embodiment, each RU HARQ SIG field 340 includes HARQ parameters for HARQ PSDUs or HARQ coding units to be transmitted within the corresponding frequency subchannel 304, but does not include HARQ parameters for HARQ PSDUs or HARQ coding units to be transmitted within other frequency subchannels 304. For example, HARQ SIG field 340-1 includes HARQ parameters for HARQ PSDU(s) or HARQ coding unit(s) included in the HARQ A-MPDU 328-1 and HARQ A-MPDU 328-2; HARQ SIG field 340-2 includes HARQ parameters for HARQ PSDUs or HARQ coding units included in the HARQ A-MPDUs 328-3; and HARQ SIG field 340-3 and HARQ SIG field 340-4 include HARQ parameters for HARQ PSDUs or HARQ coding units included in the HARQ A-MPDUs 328-4 (for example, the HARQ parameters for HARQ PSDUs 328-4 is divided between HARQ SIG field 340-3 and HARQ SIG field 340-4).

In another embodiment, the same HARQ SIG field 340 is transmitted in each subchannel 304, and the HARQ SIG field 340 includes HARQ parameters for all HARQ PSDUs to be transmitted within the HARQ PPDU 300.

In an embodiment, the HARQ A-MPDUs 328 are aligned such that the HARQ A-MPDUs 328 are of equal lengths (e.g., occupy equal number of OFDM symbols). In an embodiment, padding bits are included in a last-occurring HARQ PSDU or HARQ coding unit in one or more of the HARQ A-MPDUs 328 to ensure that the HARQ A-MPDUs 328 are of equal lengths (e.g., occupy equal number of OFDM symbols).

Trigger-based PPDUs are transmitted in response to a trigger frame. For example, an AP transmits a trigger frame to prompt one or more client stations to transmit one or more trigger-based PPDUs. Transmission of a trigger-based PPDU begins a defined time period (e.g., a short interface space (SIFS) as defined by the IEEE 802.11 Standard, or another suitable time period) after receipt of an end of a PPDU that includes the trigger frame, in an embodiment.

Figure 4:
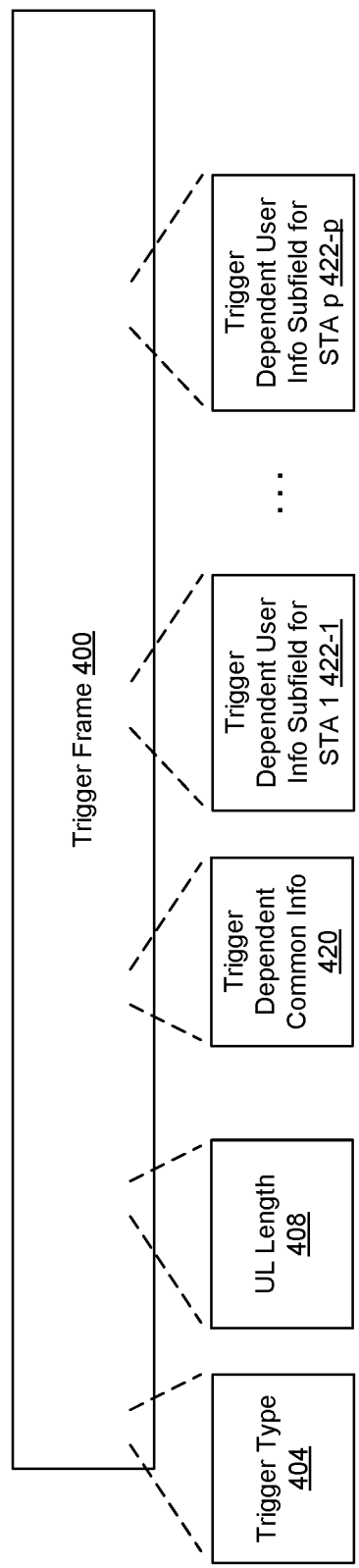
FIG. 4 is a diagram of an example trigger frame that is configured to prompt one or more client stations to transmit one or more trigger-based HARQ PHY data unit, according to an embodiment.

FIG. 4 is a diagram of an example trigger frame 400 that is configured to prompt one or more client stations to transmit one or more trigger-based HARQ PPDUs, according to an embodiment. In an embodiment, the trigger frame 400 is a MAC layer data unit (e.g., an MPDU). In an embodiment, the network interface 122/162 is configured to generate the trigger frame 400. In an embodiment, the MAC processor 126/166 is configured to generate the trigger frame 400.

The trigger frame 400 includes a trigger type field 404 that indicates a type of trigger frame from a plurality of different trigger types. For example, the current draft of the IEEE 802.11ax Standard defines eight different trigger types indicated by values 0-7 of a trigger type field, with values 8-15 reserved. In an embodiment, an additional trigger type is defined for a trigger frame that prompts one or more client stations to transmit one or more trigger-based HARQ PPDUs. In an illustrative embodiment, a value 8 of the trigger type field indicates that the trigger frame 400 is for prompting one or more client stations to transmit one or more trigger-based HARQ PPDUs. In other embodiments, another suitable value other than 8 is used, such as any of 9-15, or any other suitable value.

An uplink (UL) length field 408 indicates a duration of the trigger-based HARQ PPDU that is to be transmitted in response to the trigger frame 400. The AP 114 determines (e.g., the network interface 122 determines, the MAC processor 126 determines, etc.) the duration based on client station data buffer sizes known to the AP 114, the client station data buffer sizes indicating how much data each client station has to transmit to the AP 114. Since AP 114 has knowledge of the data buffer size of each client station, but the AP does not know a length of each MPDU that each STA will include in the trigger-based HARQ PPDU, HARQ transmissions in trigger-based HARQ PPDUs is limited to fixed-length HARQ coding units. In an embodiment, the AP 114 determines HARQ parameters to be used by the STAs for transmission of HARQ A-MPDUs that include fixed-length HARQ coding units in response to the trigger frame 400. In an embodiment, HARQ A-MPDUs that are to be transmitted by STAs in response to the trigger frame 400 are to be aligned such that the HARQ A-MPDUs are of equal lengths (e.g., occupy equal number of OFDM symbols). For example, the AP 114 determines a number of padding bits to be included in a last-occurring HARQ PSDU or HARQ coding unit in one or more of the HARQ A-MPDUs to be transmitted in response to the trigger frame 400 to ensure that the transmitted HARQ A-MPDUs are of equal lengths (e.g., occupy equal number of OFDM symbols).

In an embodiment, the trigger frame 400 includes a trigger dependent common information field 420 that is specific to trigger frames that are for prompting one or more client stations to transmit one or more trigger-based HARQ PPDUs. In an embodiment, the trigger dependent common information field 420 includes i) a duration subfield that specifies a number of OFDM symbols to be included in the trigger-based HARQ PPDU that is to be transmitted in response to the trigger frame 400, ii) a pre-FEC padding factor subfield that indicates to client station(s) a segment boundary in a last-occurring OFDM symbol of the trigger-based HARQ PPDU, wherein the client stations add padding bits prior to FEC encoding so that the FEC encoded bits end at the indicated segment boundary in the last-occurring OFDM symbol, and iii) an LDPC extra symbol segment subfield that indicates whether client station(s) should include an extra OFDM symbol segment for pre-FEC padding when LDPC is used for the trigger-based HARQ PPDU.

In an embodiment, the trigger frame 400 includes allocation information that indicates which client station(s) are to transmit trigger-based HARQ PPDUs in response to the trigger frame 400. In an embodiment, the allocation information also indicates the RUs assigned to the client station(s) for the trigger-based HARQ PPDUs.

In an embodiment, only one client station is assigned to each RU. In another embodiment, multiple client stations are permitted to be assigned to a single RU.

In an embodiment, the trigger frame 400 also includes a respective trigger dependent user information subfield 422 for each of the client station(s).

Figure 5:
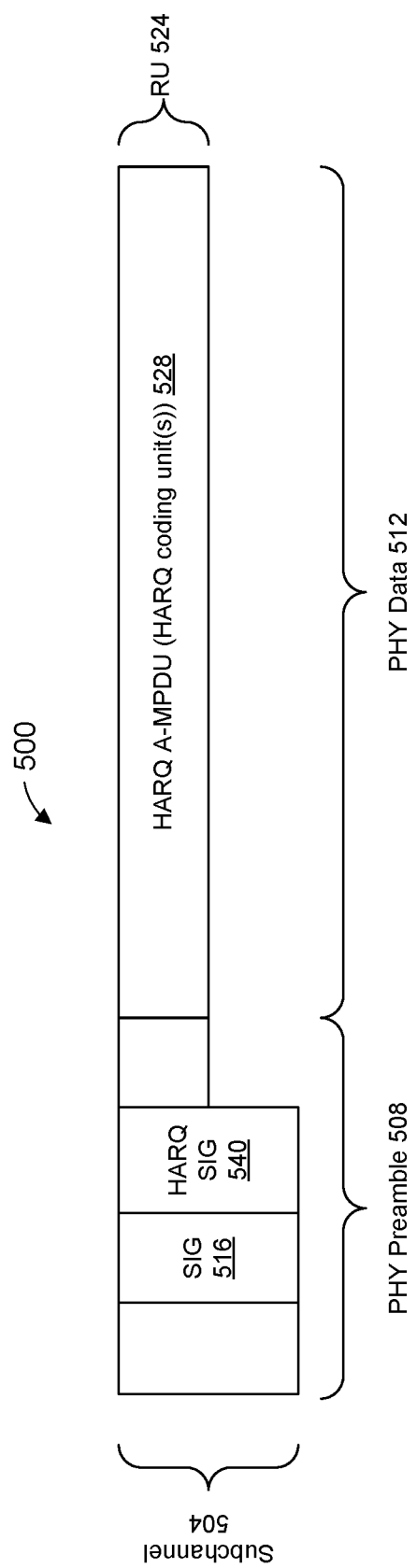
FIG. 5 is a diagram of an example trigger-based HARQ PHY data unit transmitted by a client station, according to an embodiment.

FIG. 5 is a diagram of an example trigger-based (TB) HARQ PPDU 500 transmitted by a client station, according to an embodiment. In an embodiment, the trigger-based HARQ PPDU 500 is transmitted in response to the trigger frame 400 of FIG. 4. In another embodiment, the trigger-based HARQ PPDU 500 is transmitted in response to another trigger frame that indicates a trigger-based HARQ PPDU is to be transmitted.

In an embodiment, the network interface 122/162 is configured to generate the trigger-based HARQ PPDU 500. In an embodiment, the PHY processor 130/170 is configured to generate the trigger-based HARQ PPDU 500. In an embodiment, the HARQ PPDU generator 142/192 is configured to generate the trigger-based HARQ PPDU 500.

As discussed above, a trigger frame indicates the RU(s) via which the trigger-based HARQ PPDU 500 is to be transmitted. In the example illustrated in FIG. 5, the trigger-based HARQ PPDU 500 is included in one frequency subchannel 504. In other scenarios, the trigger-based HARQ PPDU 500 is included within another suitable number of frequency subchannels 504, such as 1, 2, 3, 5, 6, 7, 8, etc. The trigger-based HARQ PPDU 500 comprises a PHY preamble portion 508 and a PHY data portion 512. In the illustrative example of FIG. 5, the trigger frame specified that the client station is to utilize the RU 524. Thus, the PHY data portion 512 includes an HARQ A-MPDU that includes one or more first transmission and/or retransmission HARQ PSDUs 528 transmitted within the RU 524.

The PHY preamble portion 508 comprises a plurality of suitable training signals (not shown). Additionally, the PHY preamble portion 508 comprises a SIG field 516. An instance of the SIG field 156 is transmitted in each frequency subchannel 504 in which the trigger-based HARQ PPDU 500 is included, according to an embodiment. In an embodiment, the SIG field 516 indicates whether the PPDU 500 includes a HARQ SIG field. In another embodiment, the SIG field 516 does not indicates whether the PPDU 500 includes a HARQ SIG field. For example, because the trigger-based HARQ PPDU 500 is transmitted in response to a trigger frame that instructs the client station to transmit a trigger-based HARQ PPDU, the AP knows that the PPDU 500 includes a HARQ SIG field. In yet another embodiment, the PPDU 500 includes does not include an HARQ SIG field. For example, because the trigger-based HARQ PPDU 500 is transmitted in response to a trigger frame that indicates HARQ parameters to be used for encoding an HARQ A-MPDU in the PHY data portion 512 of the HARQ PPDU 500, the AP knows the HARQ parameters.

The PHY preamble portion 508 also comprises a HARQ SIG field 540. In an embodiment, the HARQ SIG field 540 is transmitted within the frequency subchannel 504. In an embodiment, a duration of the HARQ SIG field 540 corresponds to a duration indicated in the trigger frame that prompts transmission of the trigger-based HARQ PPDU 500, and the SIG field 516 does not indicate a duration of the HARQ SIG field 540. In another embodiment, the SIG field 516 indicates a duration of the HARQ SIG field 540 such as the SIG field 244 described above. The HARQ SIG field 540 includes HARQ-related information that was not included in the trigger frame that prompted transmission of the HARQ PPDU 500, in an embodiment. In another embodiment, the PHY preamble portion 508 omits the HARQ SIG field 540.

Figure 6:
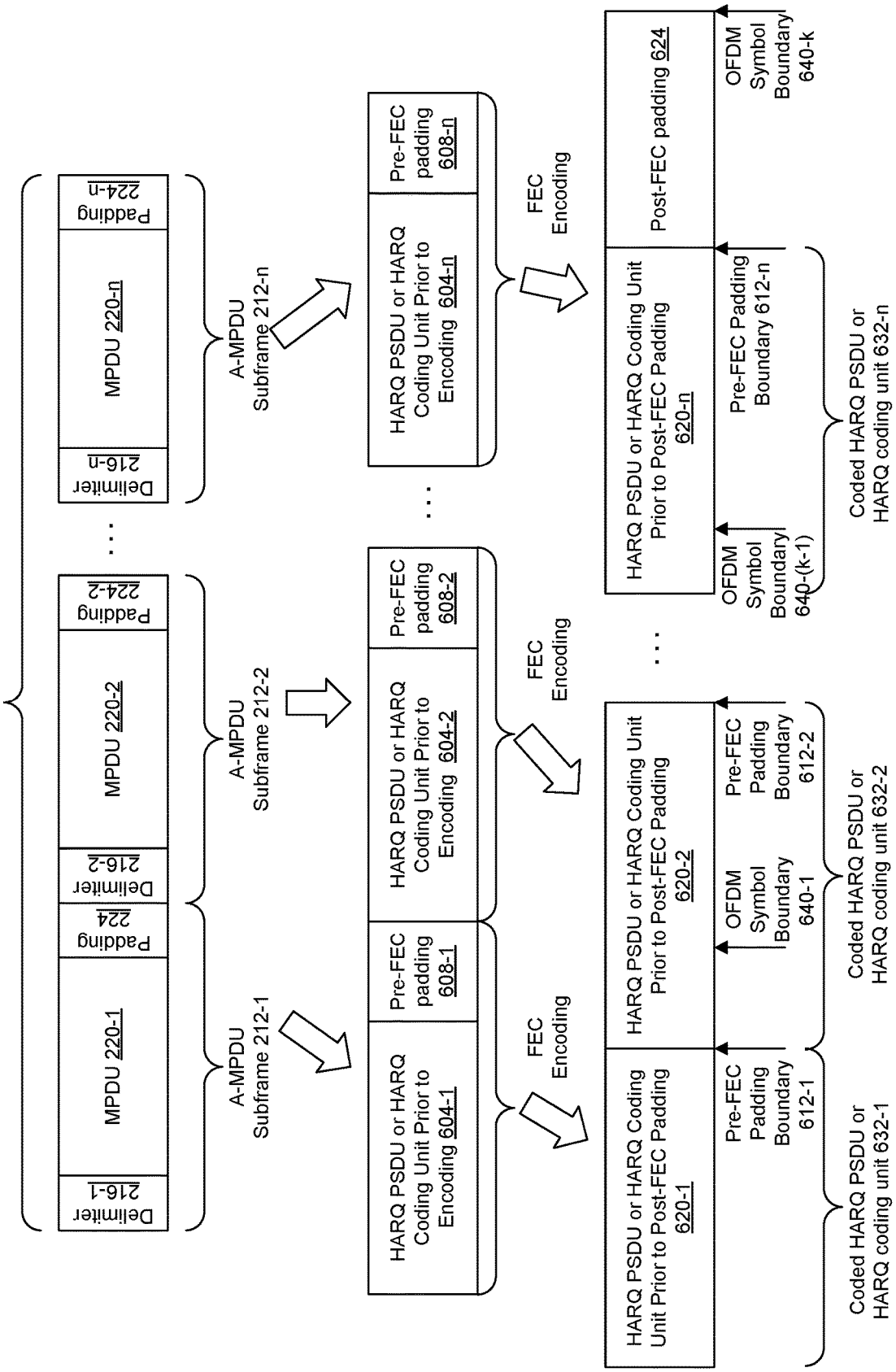
FIG. 6 is a diagram of an example process for individually encoding HARQ data units to be included in a HARQ PHY data unit, according to an embodiment.

FIG. 6 is a diagram of an example process 600 for individually encoding PSDUs or coding units to be included in a HARQ PPDU, according to an embodiment. The network interface 122/162 is configured to perform the process 600, according to an embodiment. The PHY processor 126/166 is configured to perform the process 600, according to an embodiment. The HARQ PPDU generator 142/192 is configured to perform the process 600, according to an embodiment. In other embodiments, another suitable WLAN network interface performs the process 600. In various embodiments, the process 600 is used with any of the HARQ PPDUs such as described above with reference to FIGS. 2, 3, and 5, or another suitable HARQ PPDU. The A-MPDU 208 is the same as the A-MPDU 208 discussed with reference to FIG. 2 and is not discussed in detail again for purpose of brevity. Each A-MPDU subframe 212 corresponds to respective PSDU 604 prior to FEC encoding and prior to pre-FEC padding, in an embodiment. In another embodiment, each set of one or more A-MPDU subframes 212 corresponds to a common-length HARQ coding unit 604 prior to FEC encoding and prior to pre-FEC padding.

As illustrated in FIG. 6, pre-FEC padding bits 608 are added to each PSDU (or each coding unit) prior to FEC encoding. In an embodiment, for each PSDU (or each coding unit) a corresponding pre-FEC padding boundary 612 within a last-occurring OFDM symbol for the PSDU is selected, and an amount of pre-FEC padding bits 608 is determined so that, after the PSDU (or coding unit) 604 and the pre-FEC padding bits 608 are FEC encoded, an encoded PSDU (or coding unit 620) will end at the corresponding pre-FEC padding boundary 612. In various embodiments, FEC encoding comprises BCC encoding, LDPC encoding, or some other suitable FEC encoding.

In some embodiments, determining an amount of pre-FEC padding bits includes determining whether an extra OFDM symbol segment is to be added to a last-occurring OFDM symbol of the coded HARQ PSDU/HARQ coding unit when LDPC encoding is used, and indicating in a corresponding LDPC extra symbol segment subfield in the HARQ SIG field whether the extra OFDM symbol segment is added in the last-occurring OFDM symbol, as discussed above.

After the PSDU 604 and the pre-FEC padding bits 608 are FEC encoded, post-FEC padding bits 624 are added after a last-occurring coded HARQ PSDU/HARQ coding unit 1232 so that the HARQ PPDU/HARQ coding unit ends at an OFDM symbol boundary.

In various embodiments, an indication of the selected pre-FEC padding boundary 612 for each coded HARQ PSDU/HARQ coding unit 632 is indicated in a corresponding pre-FEC padding factor subfield in the HARQ SIG field, as discussed above.

In an embodiment, for each retransmission HARQ PSDU or retransmission HARQ coding unit to be included in a single user HARQ PPDU (e.g., single user format of the HARQ PPDU 204 of FIG. 2), a communication device (e.g., the AP 114, the client station 154-1, etc.) determines, based on a number of coding bits to be included in the particular HARQ PSDU or retransmission HARQ coding unit, a number of occupied OFDM symbols and a pre-FEC padding factor corresponding to a boundary within a last-occurring OFDM symbol among the occupied OFDM symbols. In an embodiment, the communication device determines the number of occupied OFDM symbols and the pre-FEC padding factor according to $$N_{SYM,i} = \left\lceil \frac{N_{c,i}}{m_{STBC} \cdot N_{CBPS}} \right\rceil$$

$$a_i = \min\left(4, \left\lceil \frac{N_{c,i} - (N_{SYM,i} - 1) \cdot m_{STBC} \cdot N_{CBPS}}{m_{STBC} \cdot N_{CBPS,short}} \right\rceil\right)$$

where the index i corresponds to the HARQ PSDU for which the calculations are being performed, $N_{SYM},i$ is the number of OFDM symbols occupied by the $i_{th}$ HARQ PPDU, $N_{c,i}$ is the number of coded bits to be retransmitted in the $i_{th}$ HARQ PSDU, &Bps is the number of coded bits per OFDM symbol, $m_{STBC}$ is equal to 2 if space-time block is utilized (e.g., turned on) and is equal to 1 if space-time block is not utilized (e.g., turned off), $N_{CBPS,short}$ is the number of coded bits in a non-reduced data tone segment of the OFDM symbol. On the other hand, for each first transmission HARQ PSDU or a first transmission HARQ coding unit, the communication device determines, based on a length of the HARQ PSDU or HARQ coding unit and a modulation and coding scheme to be utilized for the transmission, an initial pre-FEC padding factor $a_{init,k}$ corresponding to a boundary within a last-occurring OFDM symbol among the occupied OFDM symbols and an initial number of occupied OFDM symbols $N_{SYM,k}$ as described in the IEEE 802.11ax Standard.

In some scenarios, for example for some bandwidths and/or RUs, each OFDM symbol includes a non-reduced numbers of data tones in each segment of the OFDM symbol except for the last-occurring segment of the OFDM symbol, in various embodiments. For example, in an embodiment in which four segments are included in the OFDM symbol, for a 20 MHz OFDM symbol with 234 data tones, the first three OFDM symbol segments each includes 60 data tones, and the last (fourth) OFDM symbol segment includes 54 data tones. As another example, in an embodiment in which four segments are included in the OFDM symbol, for a 40 MHz OFDM symbol with 468 data tones, the first three OFDM symbol segments each includes 120 data tones, and the last (fourth) OFDM symbol segment includes 108 data tones. As till another example, in an embodiment in which four segments are included in the OFDM symbol, for a 160 MHz OFDM symbol with 1960 data tones, the first three OFDM symbol segments each includes 492 data tones, and the last (fourth) OFDM symbol segment includes 484 data tones.

In an embodiment, for each HARQ PSDU or HARQ coding unit to be included on the A-MPDU, the communication device determines whether the pre-FEC padding factor $a_{init,k}$ needs to be adjusted to account for an OFDM signal segment that includes a reduced-number of data tones as compared to non-reduced data tone OFDM symbol segments, in an embodiment. For example, in an embodiment, such adjustment is needed for each retransmission HARQ PSDU and each first transmission HARQ PSDU that starts from an OFDM symbol segment that is not a first segment of the OFDM symbol and that ends at an OFDM symbol boundary within a last occurring OFDM symbol that does not correspond to the end of the OFDM symbol. In other words, such adjustment is needed for each retransmission HARQ PSDU and each first transmission HARQ PSDU that is misaligned with both i) a beginning of a first OFDM symbol occupied by the HARQ PSDU or HARQ coding unit and ii) an end of a last OFDM symbol occupied by the HARQ PSDU or HARQ coding unit. In an embodiment in which each OFDM symbol includes four OFDM symbol segments, for each first transmission HARQ PSDU, the communication device determines whether the following conditions are satisfied $$\mod\left(\sum_{i=0}^{k-1} a_i, 4\right) \neq 0 \qquad \text{Equation 2}$$

and $a_{init,k} \neq 4$ and $\mod\left(\sum_{i=0}^{k-1} a_i, 4\right) + a_{init,k} \geq 4$ Similarly, in an embodiment in which each OFDM symbol includes four OFDM symbol segments, in which each OFDM symbol includes four OFDM symbol segments, for each first transmission HARQ PSDU, the communication device determines whether the conditions in Equation 2 are satisfied but with $a_{init,k}$ replaced by $a_k$. If a first transmission HARQ PSDU or HARQ coding unit, or a retransmission HARQ PSDU or HARQ coding unit, satisfies the conditions of Equation 2, this indicates that the HARQ PSDU or HARQ coding unit is misaligned with both i) a beginning of a first OFDM symbol occupied by the HARQ PSDU or HARQ coding unit and ii) an end of a last OFDM symbol occupied by the HARQ PSDU or HARQ coding unit, and an adjustment is needed, in an embodiment. On the other hand, if a first transmission HARQ PSDU or HARQ coding unit, or a retransmission HARQ PSDU or HARQ coding unit, does not satisfy the conditions of Equation 2, this indicates that the HARQ PSDU or HARQ coding unit is not misaligned with both i) a beginning of a first OFDM symbol occupied by the HARQ PSDU or HARQ coding unit and ii) an end of a last OFDM symbol occupied by the HARQ PSDU or HARQ coding unit, and no adjustment is needed, in an embodiment.

In an embodiment, for a k-th retransmission HARQ PSDU, or for an HARQ coding unit, that satisfies the conditions of Equation 2, the communication device calculates a modified pre-FEC coding factor $a_k$ according to $$a_k = \left\lceil \frac{N_{c,k} - (N_{SYM,k} - 1) \cdot m_{STBC} \cdot N_{CBPS} - (N_{CBPS} - 3N_{CBPS,short}) \cdot m_{STBC}}{m_{STBC} \cdot N_{CBPS,short}} \right\rceil + 1 \qquad \text{Equation 3}$$

The communication device then determines a number of coded bits in the last-occurring OFDM symbol according to $$N_{CBPS,last,k} = (a_k - 1) \cdot N_{CBPS,short}(N_{CBPS} - 3N_{CBPS,short}) \qquad \text{Equation 4}$$

Further, based on the number of coded bits in the last-occurring OFDM symbol, the communication device determines a number of padding bits to be added to the coded bits of the retransmission HARQ PSDU or coding unit according to $$N_{PAD,Post-FEC,k} = (N_{SYM,k} - 1) \cdot N_{CBPS} + N_{CBPS,last,k} - N_{c,k} \quad \text{Equation 5}$$

On the other hand, for each first transmission HARQ PSDU or the first transmission HARQ coding unit that satisfies the conditions of Equation 2, the communication device determines an adjusted initial pre-FEC padding factor $a_{ini\_adj,k}$ according to $$a_{init,k} = \left\lceil \frac{\text{mod}(8 \cdot APEP\_LENGTH_k, m_{STBC} \cdot N_{DBPs}) - m_{STBC} \cdot (N_{DBPS} - 3 \cdot N_{DBPS,short})}{m_{STBC} \cdot N_{DBPS,short}} \right\rceil + 1 \quad \text{Equation 6}$$

Further, based on the adjusted initial pre-FEC padding factor $a_{ini\_adj,k}$, the communication device determines an initial number of data bits per symbol in the last occurring OFDM symbol $N_{DBPS,last,init,k}$ and a number of coded bits per symbol in the last occurring OFDM symbol $N_{CBPS,last,init,k}$ according to $$N_{DBPS,last,init,k} = (a_{init\_adj,k} - 1) \cdot N_{DBPS,short} + (N_{DBPS} - 3 N_{DBPS,short})$$

$$N_{CBPS,last,init,k} = (a_{init\_adj,k} - 1) \cdot N_{CBPS,short} + (N_{CBPS} - 3 N_{CBPS,short}) \quad \text{Equation 7}$$

The communication device determines, for each first transmission HARQ PSDU or a first transmission HARQ coding unit, a number of pre-FEC padding bits based on the determined $N_{CBPS,last,init,k}$ as described in the IEEE 802.11ax Standard, in an embodiment.

In an embodiment, the communication device individually encodes each first transmission HARQ PSDU or each first transmission HARQ coding unit using FEC encoding, such as BCC encoding or LDCP encoding. In an embodiment in which BCC encoding is utilized, the communication device utilizes the determined initial pre-FEC padding factor determined according to Equation 6, number of data bits in the last-occurring OFDM symbol and number of coded bits in the last-occurring OFDM symbol determined according to Equation 7. In an embodiment in which LDPC encoding is utilized, the communication device generally performs LDPC encoding process as described in the IEEE 802.11 Standard. However, during the encoding process, the communication device adjusts the determined initial pre-FEC padding factor $a_i$ determined according to Equation 6 and the initial number of OFDM symbols $N_{SYM}$ in some situations. In an embodiment, the communication device generally performs LDPC encoding process as described in the IEEE 802.11 Standard. The LDPC encoding process performed by the communication device includes determining, a number of bits to be punctured, $N_{punct}$, from codewords that are used to encode the data bits. Based on the $N_{punct}$, the communication device determines whether the initial pre-FEC padding factor $a_i$ and the initial number of OFDM symbols $N_{SYM}$ needs to be adjusted. In an embodiment, for each first transmission if $$(N_{punc} > 0.1 \times N_{CW} \times L_{LDPC} \times (1 - R)) \text{ AND } \left(N_{shrt} < 1.2 \times N_{punc} \times \frac{R}{1-R}\right)$$

is true OR if $N_{punc} > 0.3 \times N_{CW} \times L_{LDPC} \times (1 - R)$ is true, then the communication device calculates a number of available bits in encodes each first transmission HARQ PSDU or the first transmission HARQ coding unit according to $$N_{avbits,k} = \begin{cases} N_{avbits,k} + m_{STBC} \cdot (N_{CBPS} - 3 N_{CBPS,short}) & \text{if } \text{mod}\left(\left(\sum_{i=0}^{k-1} a_i + a_{init,k}\right), 4\right) = 3 \\ N_{avbits,k} + m_{STBC} \cdot N_{CBPS,short} & \text{otherwise} \end{cases} \quad \text{Equation 8}$$

The communication device then adjust the initial pre-FEC padding factor a and the initial number of OFDM symbols $N_{SYM}$ using the as described in the IEEE 802.11ax Standard, in an embodiment.

In an embodiment, for each first transmission HARQ PSDU or HARQ coding unit that satisfies conditions of Equation 2, the communication device determines the final number of coded bits per symbol in the last OFDM symbol(s), $N_{CBPS,last,k}$, for the k-th HARQ PSDU or HARQ coding unit, according to:

$$N_{CBPS,last,k} = (a_k - 1) \cdot N_{CBPS,short} + (N_{CBPS} - 3 N_{CBPS,short}) \quad \text{Equation 9}$$

On other hand, for each first transmission HARQ PSDU or HARQ coding unit that does not satisfy conditions of Equation 2, the communication device determines the final number of coded bits per symbol in the last-occurring OFDM symbol(s), $N_{CBPS,last,k}$, for the k-th HARQ PSDU or HARQ coding unit as described in IEEE 802.11ax Standard.

The communication device then determines a number of post-FEC padding bits to ne added post FEC encoding to fill the remainder of the last-occurring OFDM symbol after the pre-FEC padding factor boundary in the last-occurring OFDM symbol. For example, in an embodiment, if N HARQ PSDUs or HARQ coding units are included in the HARQ A-MPDU, the communication device determines a number of Post-FEC padding bits to be added after the last HARQ PSDU or HARQ coding unit in each of the last $m_{STBC}$ symbol(s) according to $$N_{PAD,Post-FEC} = N_{CBPS} - \text{mod}\left(\sum_{i=0}^{N-1} N_{CBPS,last,i}, N_{CBPS}\right) \quad \text{Equation 10}$$

In an embodiment, for transmission of an HARQ MU PPDU or a trigger-based HARQ PPDU (e.g., a multi-user format HARQ PPDU 204 of FIG. 2, the MU HARQ PPDU 300 of FIG. 3, the TB HARQ PPDU 500 of FIG. 5, or another suitable MU or TB HARQ PPDU) to/by multiple client stations ("users"), a communication device (e.g., the AP 114) determines respective HARQ parameters to be used for/by each of the multiple users.

In an embodiment, for each retransmission HARQ PSDU or HARQ coding unit, the communication device determines, based on the number of coded bits to be included the i-th retransmission HARQ PSDU or HARQ coding unit of the m-th user according to $$N_{SYM,m,i} = \left\lceil \frac{N_{c,m,i}}{N_{CBPS,m}} \right\rceil \quad \text{Equation 11}$$

$$a_{u,i} = m \text{ in}\left(4, \left\lceil \frac{N_{c,m,i} - (N_{SYM,u,i} - 1) \cdot N_{CBPS,m}}{N_{CBPS,short,m}} \right\rceil \right)$$

On the other hand, for each first transmission HARQ PSDU or HARQ coding unit, the communication device determines the initial number of OFDM symbols and initial pre-FEC padding factor based on a length (e.g., a number of data bits) of the HARQ PSDU or HARQ coding unit, as described in the IEEE 802.11ax Standard, in an embodiment.

In an embodiment, the communication device determines for each HARQ PSDU or HARQ coding unit to be included on the A-MPDU, the communication device determines whether the pre-FEC padding factor $a_{init,k}$ needs to be adjusted to account for an OFDM signal segment that includes a reduced-number of data tones as compared to non-reduced data tone OFDM symbol segments, in an embodiment. For example, in an embodiment, such adjustment is needed for each retransmission HARQ PSDU and each first transmission HARQ PSDU that starts from an OFDM symbol segment that is not a first segment of the OFDM symbol and that ends at an OFDM symbol boundary within a last occurring OFDM symbol that does not correspond to the end of the OFDM symbol. In other words, such adjustment is needed for each retransmission HARQ PSDU and each first transmission HARQ PSDU that is misaligned with both i) a beginning of a first OFDM symbol occupied by the HARQ PSDU or HARQ coding unit and ii) an end of a last OFDM symbol occupied by the HARQ PSDU or HARQ coding unit. In an embodiment in which each OFDM symbol includes four OFDM symbol segments, for each first transmission HARQ PSDU or HARQ coding unit, the communication device determines whether the following conditions are satisfied for the k-th HARQ PSDU or HARQ coding unit of the m-th user $$\mod\left(\sum_{i=0}^{k-1} a_{m,i}, 4\right) \neq 0 \quad \text{Equation 12}$$

and $a_{init,m,k} \neq 4$ and $\mod\left(\sum_{i=0}^{k-1} a_{m,i}, 4\right) + a_{init,m,k} \geq 4$ For a retransmission HARQ PSDU or HARQ coding unit, Equation 12 is used except that $a_{init,m,k}$ is replaced with $a_{m,k}$, in an embodiment. If a first transmission HARQ PSDU or HARQ coding unit, or a retransmission HARQ PSDU or HARQ coding unit, satisfies the conditions of Equation 12, this indicates that the HARQ PSDU or HARQ coding unit is misaligned with both i) a beginning of a first OFDM symbol occupied by the HARQ PSDU or HARQ coding unit and ii) an end of a last OFDM symbol occupied by the HARQ PSDU or HARQ coding unit, and an adjustment is needed, in an embodiment. On the other hand, if a first transmission HARQ PSDU or HARQ coding unit, or a retransmission HARQ PSDU or HARQ coding unit, does not satisfy the conditions of Equation 12, this indicates that the HARQ PSDU or HARQ coding unit is not misaligned with both i) a beginning of a first OFDM symbol occupied by the HARQ PSDU or HARQ coding unit and ii) an end of a last OFDM symbol occupied by the HARQ PSDU or HARQ coding unit, and no adjustment is needed, in an embodiment.

If the k-th retransmission HARQ PSDU or HARQ coding unit of the m-th user satisfies the conditions if Equation 12, the communication device adjusts the pre-FEC padding factor according to $$a_{m,k} = \left\lceil \frac{N_{c,m,k} - (N_{SYM,m,k} - 1) \cdot N_{CBPS,m} - (N_{CBPS,m} - 3N_{CBPS,short,m})}{N_{CBPS,short,m}} \right\rceil + 1 \quad \text{Equation 13}$$

For retransmission HARQ PSDUs or HARQ coding units which satisfy the conditions of Equation 12, the communication device determines the final number of coded bits per symbol in the last OFDM symbol(s), $N_{CBPS,last,k}$, for the k-th MPDU or coding unit according to $$N_{CBPS,last,m,k} = (a_{m,k} - 1) \cdot N_{CBPS,short,m} + (N_{CBPS,m} - 3N_{CBPS,short,m}) \quad \text{Equation 14}$$

For each retransmission HARQ PSDU or HARQ coding unit that does not satisfy the conditions of Equation 12, the communication device determines the final number of coded bits per symbol in the last OFDM symbol(s), $N_{CBPS,last,k}$, for the k-th MPDU or coding unit, as described in IEEE 802.11ax Standard. The communication device then determines a number of padding bits for the k-th retransmission HARQ PSDU or coding unit of the m-th user according to $$N_{PAD,Post-FEC,m,k} = (N_{SYM,m,k} - 1) \cdot N_{CBPS,m} + N_{CBPS,last,m} - N_{c,m,k} \quad \text{Equation 15}$$

On the other hand, for each first transmission HARQ PSDU or HARQ coding unit that satisfies conditions of Equation 12, the communication device adjusts an initial pre-FEC padding factor according to $$a_{init,m,k} = \left\lceil \frac{\mod(8 \cdot APEP\_LENGTH_{m,k}, N_{DBPS,m}) - (N_{DBPS,m} - 3 \cdot N_{DBPS,short,m})}{N_{DBPS,short}} \right\rceil + 1 \quad \text{Equation 16}$$

Then, for each first transmission HARQ PSDU or HARQ coding unit, except for the last-occurring HARQ PSDU or HARQ coding unit, that satisfies the conditions of Equation 12, the communication device determines the initial number of data bits per symbol and initial number of coded bits per symbol in the last OFDM symbol(s) for the k-th MPDU or coding unit of the m-th user according to $$N_{DBPS,last,init,m,k} = (a_{init,m,k} - 1) \cdot N_{DBPS,short,m} + (N_{DBPS,m} - 3N_{DBPS,short,m})$$

$$N_{CBPS,last,init,m,k} = (a_{init,m,k} - 1) \cdot N_{CBPS,short,m} + (N_{CBPS,m} - 3N_{CBPS,short,m}) \quad \text{Equation 17}$$

On the other hand, for each first transmission HARQ PSDU or HARQ coding unit, except for the last first transmission HARQ PSDU or HARQ coding unit, that do not satisfy the conditions described in Equation 12, the communication device determines the initial number of data bits per symbol and initial number of coded bits per symbol in the last OFDM symbol(s) are calculated as described in the IEEE 802.11ax Standard, and determines the number of pre-FEC pad bits as described in the IEEE 802.11ax Standard.

In an embodiment in which BCC coding is utilized, for each first transmission HARQ PSDU or HARQ coding unit, except for the last-occurring HARQ PSDU or HARQ coding unit, the communication device determines a final Pre-FEC padding factor, a number of data bits per symbol and a number of coded bits per symbol in the last OFDM symbol as described in the IEEE 802.11ax Standard. On the other hand, in an embodiment in which LDPC coding is used, if $$(N_{punc} > 0.1 \times N_{CW} \times L_{LDPC} \times (1-R)) \text{ AND } \left(N_{shrt} < 1.2 \times N_{punc} \times \frac{R}{1-R}\right)$$

is true OR if $N_{punc} > 0.3 \times N_{CW} \times L_{LDPC} \times (1-R)$ is true.

then the communication device calculates a number of available bits in encodes each first transmission HARQ PSDU or HARQ coding unit according to $$N_{avbits,m,k} = \begin{cases} N_{avbits,m,k} + (N_{CBPS,m} - 3N_{CBPS,short,m}) & \text{if } \mathrm{mod}\left(\left(\sum_{i=0}^{k-1} a_{m,i} + a_{init,m,k}\right), 4\right) = 3 \\ N_{avbits,m,k} + N_{CBPS,short,m} & \text{otherwise} \end{cases}$$

Equation 18 and adjust the initial pre-FEC padding factor a and the initial number of OFDM symbols $N_{SYM}$ using the as described in the IEEE 802.11ax Standard, in an embodiment.

Further, in an embodiment, for each first transmission HARQ PSDU or HARQ coding unit that satisfies the conditions of Equation 12, the communication device determines a final number of coded bits in the last OFDM symbol(s), $N_{CBPS,last,m,k}$, for the k-th HARQ PSDU or HARQ coding unit of m-th user, according to $$N_{CBPS,last,m,k} = (a_{m,k}-1) \cdot N_{CBPS,short,m} + (N_{CBPS,m} - 3N_{CBPS,short,m})$$

Equation 19

On the other hand, for each first transmission HARQ PSDU or HARQ coding unit that does not satisfy conditions of Equation 12, the communication device determines the final number of coded bits per symbol in the last OFDM symbol(s), $N_{CBPS,last,m,k}$, for the k-th MPDU or coding unit of m-th user, as described in the IEEE 802.11ax Standard, in an embodiment.

In an embodiment, for the last HARQ PSDU or HARQ coding unit of each user, the communication device is configured to ensure that the total number of OFDM symbols occupied by each user is the same among the users, and parameters such as pre-FEC padding factor, and LDPC Extra segment are the same among the users.

In an embodiment, if the total number of HARQ PSDUs or HARQ coding units in the A-MPDU of the m-th user is $N_m$, the communication device determines, for $m \in [0, N_{user,total})$, the initial total number of symbols in the last-occurring HARQ PSDU or HARQ coding unit of the m-th user according to $$N_{SYM,init,A-MPDU,m} = \sum_{i=0}^{N_m-2} (N_{SYM,m,i} - 1) + (N_{SYM,init,mN_m-1} - 1) + \left\lceil \left(\sum_{i=0}^{N_m-2} a_{m,i} + a_{init,mN_m-1}\right) / 4 \right\rceil$$

Equation 20 and determines the initial pre-FEC padding factor of the A-MPDU according to $$a_{init,A-MPDU,m} = \mathrm{mod}\left(\sum_{i=0}^{N_m-2} a_{mi} + a_{init,mN_m-1} - 1, 4\right) + 1$$

Equation 21

The communication device then determines, among the users, the user index with the longest encoded packet duration according to $$u_{max} = \arg\max_{u=0}^{N_{user,total}-1}(N_{SYM,init,A-MPDU,u} - 1 + a_{init,A-MPDU,u}/4)$$

Equation 22

The communication device the determines common $N_{SYM,init,A-MPDU}$ and $a_{init,A-MPDU}$ values among the users according to $$N_{SYM,init,A-MPDU} = N_{SYM,init,A-MPDU,u_{max}}$$

$$a_{init,A-MPDU} = a_{init,A-MPDU,u_{max}}$$

Equation 24

Based on the common $N_{SYM,init,A-MPDU}$ and $a_{init,A-MPDU}$ values, the communication device determines a number of OFDM symbols and initial pre-FEC padding factor for the last HARQ PSDU or HARQ coding unit for the user with the user index $u_{max}$ according to $$N_{SYM,init,u_{max},N_{u_{max}}-1} = N_{SYM,init,A-MPDU} - \sum_{i=0}^{N_{u_{max}}-2}(N_{SYM,u_{max},i}-1) - \left\lceil\left(\sum_{i=0}^{N_{u_{max}}-2} a_{u_{max},i}\right)/4\right\rceil$$

Equation 25

$$a_{init,A-MPDU} = \mathrm{mod}\left(\sum_{i=0}^{N_{u_{max}}-2} a_{u_{max},i} + a_{init,u_{max},N_{u_{max}}-1} - 1, 4\right) + 1$$

If the last-occurring HARQ PSDU or HARQ coding unit corresponding to the user with the user index $u_{max}$ satisfies the conditions of Equation 12, then the communication device adjusts the initial pre-FEC padding factor for the user with the user index $u_{max}$ according to $$a_{init,u_{max},N_{u_{max}}-1} = \qquad \text{Equation 26}$$

$$\left\lceil \frac{\text{mod}\left(8 \cdot \text{APEP\_LENGTH}_{u_{max},N_{u_{max}}-1},\right.}{\left.N_{DBPS,u_{max}}\right) - (N_{DBPS,u_{max}} - 3 \cdot N_{DBPS,short,u_{max}})}{N_{DBPS,short,u_{max}}} \right\rceil + 1$$

The communication device then sets $N_{SYM,init,A-MPDU}$ and $a_{init,A-MPDU}$ values for other users to the value of $a_{init,umax, Numax-1}$ determined according to equation 25, in an embodiment.

The communication device then determines the initial number of OFDM symbols and initial pre-FEC padding factor for the last-occurring HARQ PSDU or HARQ coding unit for the other users based on the the common $N_{SYM,init,A-MPDU}$ and $a_{init,A-MPDU}$ values according to $$N_{SYM,init,m,N_m-1} = \qquad \text{Equation 27}$$

$$N_{SYM,init,A-MPDU} - \sum_{i=0}^{N_m-2}(N_{SYM,m,i} - 1) - \left\lceil \left(\sum_{i=0}^{N_m-2} a_{m,i}\right) / 4 \right\rceil$$

$$a_{init,A-MPDU} = \text{mod}\left(\sum_{i=0}^{N_m-2} a_{m,i} + a_{init,m,N_m-1} - 1, 4\right) + 1$$

In an embodiment, for each user for which the last-occurring HARQ PSDU or HARQ coding unit satisfies the conditions of Equation 12, the communication device determines an initial number of data bits and an initial number of coded to be included in the last-occurring OFDM symbol according to Equation 17. On the other hand, for each user for which the last-occurring HARQ PSDU or HARQ coding unit does not satisfy the conditions of Equation 12, the communication device determines an initial number of data bits and an initial number of coded to be included in the last-occurring OFDM symbol as described in the IEEE 802.11ax Standard, in an embodiment.

In an embodiment, for each user for which LDPC coding is being utilized, the communication device determines the number of pre-FEC padding bits for the last-occurring HARQ PSDU or HARQ coding unit according to $$N_{PAD,Pre\_FEC,m,N_m-1} = N_{SYM,init,m,N_m-1} \cdot N_{DBPS,m} +$$
$$N_{DBPS,last,init,m} - 8 \cdot \text{APEP\_LENGTH}_{m,N_m-1} \qquad \text{Equation 28}$$

and further determines LDPC parameters $N_{pld,m,Nm-1}$ and $N_{avbits,m,Nm-1}$ according to $$N_{pld,m,N_m-1} = (N_{SYM,init,m,N_m-1} - 1) \cdot N_{DBPS,m} + N_{DBPS,last,init,m}$$

$$N_{avbits,m,N_m-1} = (N_{SYM,init,m,N_m-1} - 1) \cdot N_{CBPS,m} + N_{CBPS,last,init,m} \qquad \text{Equation 29}$$

Continuing with the LDPC encoding process, for each user $m \in [0, N_{user,total})$, if $$(N_{punc} > 0.1 \times N_{CW} \times L_{LDPC} \times (1-R)) \text{ AND } \left(N_{shrt} < 1.2 \times N_{punc} \times \frac{R}{1-R}\right)$$

is true OR if $N_{punc} > 0.3 \times N_{CW} \times L_{LDPC} \times (1-R)$ is true.

then the communication device determines a number of available bits in the last-occurring HARQ PSDU or HARQ coding unit according to $$N_{avbits,m,N_m-1} = \begin{cases} N_{avbits,m,N_m-1} + (N_{CBPS,m} - 3N_{CBPS,short,m}) & \text{if mod}(a_{init,A-MPDU}, 4) = 3 \\ N_{avbits,m,N_m-1} + N_{CBPS,short,m} & \text{otherwise} \end{cases} \qquad \text{Equation 30}$$

and adjusts the initial number of OFDM symbols $N_{SYM,init,Nm-1}$ and the initial pre-FEC padding factor $a_{m,Nm-1}$ according to $$N_{SYM,m,N_m-1} = \begin{cases} N_{SYM,init,m,N_m-1} + 1 & \text{if } a_{init,m,N_m-1} = 4 \\ N_{SYM,init,m,N_m-1} & \text{otherwise} \end{cases} \qquad \text{Equation 31}$$

$$a_{m,N_m-1} = \begin{cases} 1 & \text{if } a_{init,m,N_m-1} = 4 \\ a_{init,m,N_m-1} + 1 & \text{otherwise} \end{cases}$$

The communication device then determines a total number of OFDM symbols $N_{SYM,A-MPDU}$ according to $$N_{SYM,A-MPDU} = \begin{cases} N_{SYM,A-MPDU,init} + 1 & \text{if } a_{init,A-MPDU} = 4 \\ N_{SYM,A-MPDU,init} & \text{otherwise} \end{cases} \qquad \text{Equation 32}$$

and determines a pre-FEC padding factor $a_{A-MPDU}$ for the A-MPDU according to $$a_{A-MPDU} = \begin{cases} 1 & \text{if } a_{init,A-MPDU} = 4 \\ a_{init,A-MPDU} & \text{otherwise} \end{cases} \qquad \text{Equation 33}$$

Further, in none of the users satisfy the condition $$(N_{punc} > 0.1 \times N_{CW} \times L_{LDPC} \times (1-R)) \text{ AND } \left(N_{shrt} < 1.2 \times N_{punc} \times \frac{R}{1-R}\right)$$

is true OR if $N_{punc} > 0.3 \times N_{CW} \times L_{LDPC} \times (1-R)$ is true, then the communication device sets $N_{SYM,init,m,Nm-1} = N_{SYM,init,m,Nm-1}$ and $a_{A-MPDU} = a_{init,A-MPDU}$ for each user $m \in [0, N_{user,total})$.

For each last-occurring HARQ PSDU or HARQ coding unit that satisfies the conditions of Equation 12, the communication device determines the final number of coded bits in the last-occurring OFDM symbol $N_{CBPS,last,m,Nm-1}$ according to $$N_{CBPS,last,m,N_m-1} = (a_{m,N_m-1} - 1) \cdot N_{CBPS,short,m} + (N_{CBPS,m} - 3N_{CBPS,short,m}) \qquad \text{Equation 34}$$

On the other hand, for each last-occurring HARQ PSDU or HARQ coding unit that does not satisfy the conditions of Equation 12, the communication device determines the final number of coded bits in the last-occurring OFDM symbol $N_{CBPS,last,m,Nm-1}$ as described in the IEEE 802.11ax Standard, in an embodiment.

The communication device then determines a number of post-FEC encoding padding bits for each user $m \in [0, N_{user,total})$ according to $$N_{PAD,Post-FEC,m} = N_{CBPS,m} - \text{mod}\left(\sum_{i=0}^{N_m-1} N_{CBPS,last,m,i}, N_{CBPS,m}\right) \quad \text{Equation 35}$$

Figure 7:
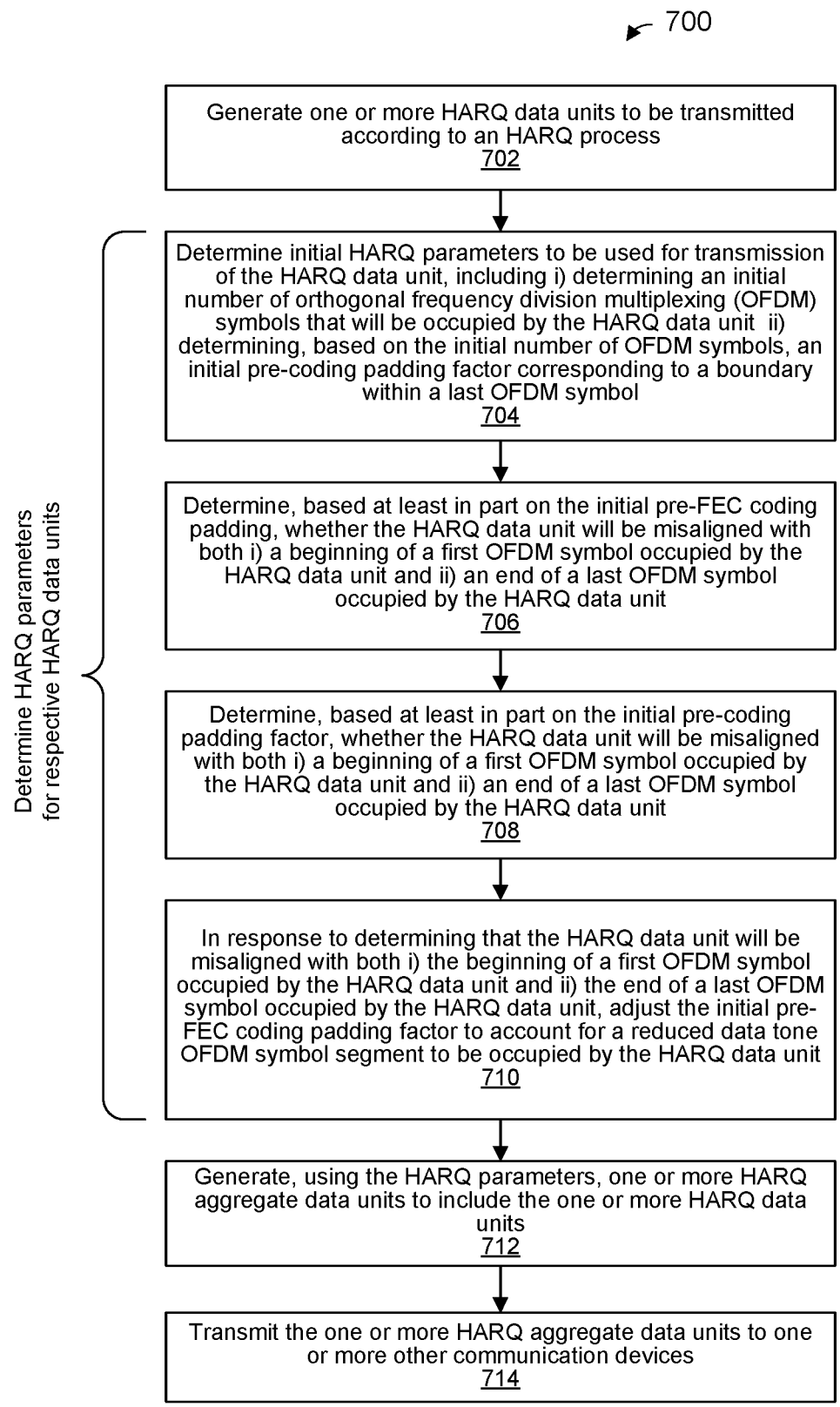
FIG. 7 is a flow diagram of an example method for method for HARQ transmission in a WLAN, according to an embodiment.

FIG. 7 is a flow diagram of an example method for method for HARQ transmission in a WLAN, according to an embodiment. In some embodiments, the network interface 122/162 is configured to implement the method 700. In some embodiments, the PHY processor 130/170 is configured to implement at least a portion of the method 700. In an embodiment, the HARQ PPDU generator 142/192 is configured to implement at least a portion of the method 700.

At block 702, a communication device generates (e.g., the network interface 122/162 generate, the MAC processor determines 126/166 generates, the PHY processor 130/170 generates, etc.) one or more HARQ data units to be transmitted according to an HARQ process. In another embodiment, the communication device receives, from one or more other communication devices, information about one or more HARQ data units to be transmitted according to an HARQ process to the communication device from the one or more other communication devices.

At blocks 704-710, the communication device determines, for respective HARQ data units among the one or more HARQ data units, HARQ parameters to be used for transmission of the HARQ data unit according to the HARQ process. At block 704, the communication device determines initial HARQ parameters to be used for transmission of the HARQ data unit. In an embodiment, block 704 includes i) determining an initial number of orthogonal frequency division multiplexing (OFDM) symbols that will be occupied by the HARQ data unit and ii) determining, based on the initial number of OFDM symbols, an initial pre-coding (e.g., pre-FEC coding) padding factor corresponding to a boundary within a last OFDM symbol. In an embodiment, for retransmission HARQ data units, the communication device determines the initial number of OFDM symbols and the initial pre-coding padding factor as described above in connection with Equation 1 or in connection with Equation 11. In other embodiments, the communication device determines the initial number of OFDM symbols and the initial pre-coding padding factor using other suitable techniques.

At block 706, for respective HARQ data units among the one or more HARQ data units, the communication device determines, based at least in part on the initial pre-coding padding factor determine for the HARQ data unit, whether the HARQ data unit will be misaligned with both i) a beginning of a first OFDM symbol occupied by the HARQ data unit and ii) an end of a last OFDM symbol occupied by the HARQ data unit. In an embodiment, the communication device determines that the HARQ data unit will be misaligned with both i) the beginning of a first OFDM symbol occupied by the HARQ data unit and ii) the end of a last OFDM symbol occupied by the HARQ data unit if the conditions discussed above in connection with Equation 2 or in connection with Equation 12 is satisfied, and determines that the HARQ data unit will not be misaligned otherwise. In other embodiments, the communication device utilizes other suitable criteria to determine whether the HARQ data unit will be misaligned.

At block 708, for respective HARQ data units for which it is determined that the HARQ data unit will be misaligned with both i) the beginning of a first OFDM symbol occupied by the HARQ data unit and ii) the end of a last OFDM symbol occupied by the HARQ data unit, the communication device adjusts the initial pre-coding padding factor to account for a reduced data tone OFDM symbol segment to be occupied by the HARQ data unit. For example, the communication device adjusts the initial number of OFDM symbols and the initial pre-coding padding factor as described above in connection with Equation 6 or Equation 13. In other embodiments, other suitable adjustments are utilized. Adjusting the initial number of OFDM symbols for the HARQ data units that are misaligned with both i) a beginning of a first OFDM symbol occupied by the HARQ data unit and ii) an end of a last OFDM symbol occupied by the HARQ data unit ensures that a proper number of coded bits in the last-occurring OFDM symbol of the HARQ data unit is determined, in an embodiment.

At block 712, the communication device generates, using the HARQ parameters, one or more HARQ aggregate data units to include the one or more HARQ data units. For example, the communication device generates the HARQ A-MPDU 234 of FIG. 2. In another embodiment, the communication device generates the HARQ A-MPDUs 328 of FIG. 3. In other embodiments, the communication device generates other suitable HARQ aggregate data units. In another embodiment, the communication device generates a trigger frame (e.g., the trigger frame 400 of FIG. 4 or another suitable trigger frame) that includes the determined HARQ parameters for respective HARQ data units, to trigger transmission of the HARQ data units by the one or more other communication devices.

At block 714, the communication device transmits the one or more HARQ aggregate data units to one or more other communication devices. In another embodiment, the communication device transmits the trigger frame to the one or more other communication devices, to trigger transmission of the one or more HARQ data units by the one or more other communication devices. In response to receiving the trigger frame, communication devices, among the one or more other communication devices, generate, using HARQ parameters included in the trigger frame, A-MPDU(s) (e.g., A-MPDU 538 of FIG. 5 or other suitable A-MPDU) to include sets of HARQ data units among the one or more HARQ data units, and transmit the A-MPDU(s) to the communication device, in an embodiment.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions are stored in a computer readable memory such as a random access memory (RAM), a read only memory (ROM), a flash memory, etc. The software or firmware instructions include machine readable instructions that, when executed by one or more processors, cause the one or more processors to perform various acts.

When implemented in hardware, the hardware may comprise one or more of discrete components, an integrated circuit, an application-specific integrated circuit (ASIC), a programmable logic device (PLD), etc.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A method for hybrid automatic repeat request (HARQ) transmission in a wireless local area network (WLAN), the method comprising:
   generating, at a communication device, one or more HARQ data units to be transmitted according to an HARQ process;
   for respective HARQ data units among the one or more HARQ data units, determining, by the communication device, HARQ parameters to be used for transmission of the HARQ data unit, including:
      determining initial HARQ parameters to be used for transmission of the HARQ data unit, including i) determining an initial number of orthogonal frequency division multiplexing (OFDM) symbols that will be occupied by the HARQ data unit and ii) determining, based on the initial number of OFDM symbols, an initial pre-FEC coding padding factor corresponding to a boundary within a last OFDM symbol,
      determining, based at least in part on the initial pre-coding padding factor, whether the HARQ data unit will be misaligned with both i) a beginning of a first OFDM symbol occupied by the HARQ data unit and ii) an end of a last OFDM symbol occupied by the HARQ data unit, and
      in response to determining that the HARQ data unit will be misaligned with both i) the beginning of a first OFDM symbol occupied by the HARQ data unit and ii) the end of a last OFDM symbol occupied by the HARQ data unit, adjusting the initial pre-coding padding factor to account for a reduced data tone OFDM symbol segment to be occupied by the HARQ data unit;
   generating, at the communication device using the HARQ parameters, one or more HARQ aggregate data units to include the one or more HARQ data units; and
   transmitting, with the communication device, the one or more HARQ aggregate data units to one or more other communication devices.

2. The method of claim 1, wherein generating the one or more HARQ data units comprises generating a plurality of variable length HARQ data units.

3. The method of claim 2, wherein determining HARQ parameters to be used for transmission of the one or more HARQ data units comprises determining respective HARQ parameters for respective ones of the plurality of variable length HARQ data unit.

4. The method of claim 1, wherein generating the one or more HARQ data units comprises generating a plurality of fixed-length HARQ coding units.

5. The method of claim 4, wherein determining HARQ parameters to be used for transmission of the one or more HARQ data units comprises determining a set of HARQ parameters that apply to each fixed-length HARQ coding unit among the plurality of fixed-length HARQ coding units.

6. The method of claim 1, wherein determining initial HARQ parameters for transmission of the HARQ data unit includes selecting, based at least in part on the initial number of OFDM symbols, an initial segment boundary within a last-occurring orthogonal frequency division (OFDM) symbol to be occupied by the HARQ data unit, such that, after encoding the HARQ data unit according to a forward error correction (FEC) code, coded bits of the HARQ data unit end on the selected segment boundary.

7. The method of claim 1, wherein
   the one or more HARQ data unit include at least one retransmission HARQ data unit, and
   determining the initial number of OFDM symbols that will be occupied by the HARQ data unit includes determining the initial number of OFDM symbols that will be occupied by the retransmission HARQ data unit based on a number of coded bits that are to be retransmitted in the retransmission HARQ data unit.

8. The method of claim 7, wherein
   the one or more HARQ data units further include at least one first transmission HARQ data unit, and
   determining the initial number of OFDM symbols that will be occupied by the HARQ data unit includes determining the initial number of OFDM symbols that will be occupied by the first transmission HARQ data unit based on a number of data bits that are to be transmitted in the retransmission HARQ data unit.

9. The method of claim 1, wherein determining whether the HARQ data unit will be misaligned with both i) the beginning of a first OFDM symbol occupied by the HARQ data unit and ii) the end of a last OFDM symbol occupied by the HARQ data unit comprises determining whether the HARQ data unit will be misaligned with both i) the beginning of a first OFDM symbol occupied by the HARQ data unit and ii) the end of a last OFDM symbol occupied by the HARQ data unit further based on one or more pre-coding padding factors determined for other HARQ data unit that are to be included in an aggregate HARQ data unit prior to the HARQ data unit in the aggregate HARQ data unit.

10. The method of claim 1, wherein
    the PHY data unit is a multi-user (MU) PHY data unit to be transmitted to a plurality of other communication devices,
    the one or more HARQ data units include respective HARQ data units to be transmitted in respective aggregate HARQ data units to respective other communication devices among the plurality of other communication device, and
    determining HARQ parameters to be used for transmission of the one or more HARQ data units includes determining HARQ parameters for a last-occurring HARQ data unit in each aggregate HARQ data unit such that the respective aggregate HARQ data units include equal numbers of OFDM symbols.

11. A communication device, comprising:
    a network interface device implemented on one or more integrated circuit (IC) devices, wherein the one or more IC devices are configured to:
       generate one or more hybrid automatic repeat request (HARQ) data units to be transmitted according to an HARQ process,
       for respective HARQ data units among the one or more HARQ data units, determine HARQ parameters to be used for transmission of the HARQ data unit, the one or more IC devices being configured to:
          determine initial HARQ parameters to be used for transmission of the HARQ data unit, including i) determining an initial number of orthogonal frequency division multiplexing (OFDM) symbols that will be occupied by the HARQ data unit and ii) determining, based on the initial number of OFDM symbols, an initial pre-coding padding factor corresponding to a boundary within a last OFDM symbol, determine, based at least in part on the initial pre-coding padding factor, whether the HARQ data unit will be misaligned with both i) a beginning of a first OFDM symbol occupied by the HARQ data unit and ii) an end of a last OFDM symbol occupied by the HARQ data unit, and in response to determining that the HARQ data unit will be misaligned with both i) the beginning of a first OFDM symbol occupied by the HARQ data unit and ii) the end of a last OFDM symbol occupied by the HARQ data unit, adjust the initial pre-coding padding factor to account for a reduced data tone OFDM symbol segment to be occupied by the HARQ data unit, generate, using the HARQ parameters, one or more HARQ aggregate data units to include the one or more HARQ data units, and transmit the one or more HARQ aggregate data units to one or more other communication devices.

12. The communication device of claim 11, wherein the one or more IC devices are configured to generate the one or more HARQ data units at least by generating a plurality of variable-length HARQ data units.

13. The communication device of claim 12, wherein the one or more IC devices are configured to determine respective HARQ parameters for respective ones of the plurality of variable length HARQ data unit.

14. The communication device of claim 11, wherein the one or more IC devices are configured to generate the one or more HARQ data units at least by generating a plurality of fixed-length HARQ coding units.

15. The communication device of claim 14, wherein the one or more IC devices are configured to determine a set of HARQ parameters that apply to each fixed-length HARQ coding unit among the plurality of fixed-length HARQ coding units.

16. The communication device of claim 11, wherein the one or more IC devices are configured to select, based at least in part on the initial number of OFDM symbols, an initial segment boundary within a last-occurring orthogonal frequency division (OFDM) symbol to be occupied by the HARQ data unit, such that, after encoding the HARQ data unit according to a forward error correction (FEC) code, coded bits of the HARQ data unit end on the selected segment boundary.

17. The communication device of claim 11, wherein the one or more HARQ data unit include at least one retransmission HARQ data unit, and the one or more IC devices are configured to determine the initial number of OFDM symbols that will be occupied by the retransmission HARQ data unit based on a number of coded bits that are to be retransmitted in the retransmission HARQ data unit.

18. The communication device of claim 11, wherein the one or more HARQ data units further include at least one first transmission HARQ data unit, and the one or more IC devices are configured to determine the initial number of OFDM symbols that will be occupied by the first transmission HARQ data unit based on a number of data bits that are to be transmitted in the retransmission HARQ data unit.

19. The communication device of claim 11, wherein the one or more IC devices are configured to determine whether the HARQ data unit will be misaligned with both i) the beginning of a first OFDM symbol occupied by the HARQ data unit and ii) the end of a last OFDM symbol occupied by the HARQ data unit further based on one or more pre-coding padding factors determined for other HARQ data unit that are to be included in an aggregate HARQ data unit prior to the HARQ data unit in the aggregate HARQ data unit.

20. The communication device of claim 11, wherein the PHY data unit is a multi-user (MU) PHY data unit to be transmitted to a plurality of other communication devices, the one or more HARQ data units include respective HARQ data units to be transmitted in respective aggregate HARQ data units to respective other communication devices among the plurality of other communication device, and the one or more IC devices are configured to determine HARQ parameters for a last-occurring HARQ data unit in each aggregate HARQ data unit such that the respective aggregate HARQ data units include equal numbers of OFDM symbols.

* * * * *